US010339667B2

(12) United States Patent
Tafazoli Bilandi et al.

(10) Patent No.: US 10,339,667 B2
(45) Date of Patent: Jul. 2, 2019

(54) METHOD AND APPARATUS FOR LOCATING A WEAR PART IN AN IMAGE OF AN OPERATING IMPLEMENT

(71) Applicant: Motion Metrics International Corp, Vancouver (CA)

(72) Inventors: Shahram Tafazoli Bilandi, Vancouver (CA); Mahdi Ramezani, Vancouver (CA); Amin Suzani, Vancouver (CA); Neda Parnian, Coquitlam (CA); Matthew Alexander Baumann, Vancouver (CA); Saman Nouranian, Vancouver (CA); Nazanin Hamzei, Vancouver (CA); Mohammad Sameti, Coquitlam (CA); Saeed Karimifard, Vancouver (CA)

(73) Assignee: Motion Metrics International Corp, Vancouver, British Columbia (CA)

( * ) Notice: Subject to any disclaimer, the term of this patent is extended or adjusted under 35 U.S.C. 154(b) by 36 days.

(21) Appl. No.: 15/571,463

(22) PCT Filed: May 13, 2016

(86) PCT No.: PCT/CA2016/000144
§ 371 (c)(1),
(2) Date: Nov. 2, 2017

(87) PCT Pub. No.: WO2016/183661
PCT Pub. Date: Nov. 24, 2016

(65) Prior Publication Data
US 2018/0130222 A1 May 10, 2018

Related U.S. Application Data

(60) Provisional application No. 62/162,203, filed on May 15, 2015.

(51) Int. Cl.
*G06K 9/00* (2006.01)
*G06T 7/70* (2017.01)
(Continued)

(52) U.S. Cl.
CPC .................. *G06T 7/70* (2017.01); *E02F 9/26* (2013.01); *G01B 11/04* (2013.01); *G06K 9/6202* (2013.01);
(Continued)

(58) Field of Classification Search
CPC ......... G06T 7/70; G06T 7/277; G06T 7/0008; G06T 7/0006; G06T 7/13; G06T 7/004;
(Continued)

(56) References Cited

U.S. PATENT DOCUMENTS

| 8,411,930 B2 | 4/2013 | Ridley et al. |
| 2002/0128790 A1 | 9/2002 | Woodmansee |

(Continued)

FOREIGN PATENT DOCUMENTS

| CN | 201401169 | 2/2010 |
| CN | 202471412 | 10/2012 |

(Continued)

OTHER PUBLICATIONS

International Search Report issued by the Canadian Intellectual Property Office in connection with International Patent Application No. PCT/CA2016/000144, dated Aug. 4, 2017, 3 pages.
(Continued)

*Primary Examiner* — Jose L Couso

(57) ABSTRACT

A method and apparatus for locating and/or determining the condition of a wear part in an image of an operating implement associated with heavy equipment is disclosed. The method involves capturing at least one image of the operating implement during operation of the heavy equipment, the image including a plurality of pixels each having
(Continued)

an intensity value. The method also involves selecting successive pixel subsets within the plurality of pixels, and processing each pixel subset to determine whether pixel intensity values in the pixel subset meet a matching criterion indicating a likelihood that the pixel subset corresponds to the wear part. The matching criterion is based on processing a labeled set of training images during a training exercise prior to capturing the at least one image of the operating implement.

32 Claims, 14 Drawing Sheets

(51) Int. Cl.
| | |
|---|---|
| G01B 11/04 | (2006.01) |
| G06N 3/08 | (2006.01) |
| G06T 7/00 | (2017.01) |
| G06T 7/277 | (2017.01) |
| E02F 9/26 | (2006.01) |
| G06K 9/62 | (2006.01) |
| G06N 3/04 | (2006.01) |
| E02F 9/28 | (2006.01) |

(52) U.S. Cl.
CPC ......... *G06N 3/0445* (2013.01); *G06N 3/0454* (2013.01); *G06N 3/08* (2013.01); *G06T 7/0008* (2013.01); *G06T 7/277* (2017.01); E02F 9/2808 (2013.01); G06T 2207/10016 (2013.01); G06T 2207/20076 (2013.01); G06T 2207/20084 (2013.01); G06T 2207/30164 (2013.01); G06T 2207/30252 (2013.01)

(58) Field of Classification Search
CPC . G06T 7/001; G06T 7/74; G06T 2207/30108; G06T 2207/30164; G06T 2207/10152; G06T 2207/20072; G06T 2207/20076; G06T 2207/20081; G06T 2207/20084; G06T 2207/30252; E02F 9/26; E02F 9/267; E02F 9/2808; E02F 9/28; E02F 9/268; E02F 9/2025; E02F 3/34; G06K 9/6202; G06K 9/46; G06K 9/4604; G06K 9/6212; G06K 9/6256; G06K 9/62; G06K 9/6269; G06K 9/6277; G06K 9/6267; G06K 9/629; B60R 1/00; B60R 11/04; B60R 21/01538; B60R 2300/105; B60R 2300/70; B60R 2300/607; G01B 11/04; H04N 7/183; H04N 7/188; H04N 7/181; G06N 3/02; G06N 3/08; G06N 3/022; E21C 25/06; E21C 27/02; B23P 6/002; G07D 7/2016; G07D 7/2075; G01M 13/021; G01N 21/88; G01N 21/84; A01B 23/02; A01B 15/00; A01B 15/02; G05B 23/0283; G06Q 10/20
USPC .................................................. 382/100–325
See application file for complete search history.

(56) References Cited

U.S. PATENT DOCUMENTS

| | | | | |
|---|---|---|---|---|
| 2007/0248246 | A1* | 10/2007 | Cherkassky | G01N 21/8983 382/111 |
| 2013/0199693 | A1 | 8/2013 | Tank et al. | |
| 2013/0287264 | A1 | 10/2013 | Chen et al. | |
| 2014/0003708 | A1* | 1/2014 | Datta | G06K 9/6256 382/159 |
| 2014/0105481 | A1* | 4/2014 | Hasselbusch | G06T 7/0006 382/141 |
| 2015/0149049 | A1* | 5/2015 | Bewley | E02F 9/2816 701/50 |
| 2015/0339810 | A1* | 11/2015 | Lim | G06T 7/001 382/152 |
| 2016/0163035 | A1* | 6/2016 | Chang | G06K 9/4628 382/149 |
| 2016/0171346 | A1* | 6/2016 | Han | G06K 9/66 382/103 |
| 2016/0180195 | A1* | 6/2016 | Martinson | G06K 9/6256 382/103 |
| 2016/0189010 | A1* | 6/2016 | Tang | G06K 9/66 382/113 |
| 2016/0237640 | A1* | 8/2016 | Carpenter | E02F 9/267 |
| 2017/0067229 | A1* | 3/2017 | Stock | E02F 9/2054 |
| 2017/0091375 | A1* | 3/2017 | Lu | G06Q 10/20 |
| 2017/0091924 | A1* | 3/2017 | Hasselbusch | G06T 7/0006 |
| 2017/0103506 | A1* | 4/2017 | Dandibhotla | H04N 7/183 |
| 2017/0287124 | A1* | 10/2017 | Lim | G06T 7/001 |
| 2018/0084708 | A1* | 3/2018 | Neitemeier | G06T 7/0004 |
| 2018/0089823 | A1* | 3/2018 | Carpenter | G06T 7/0004 |
| 2018/0165884 | A1* | 6/2018 | Wagner | G06K 9/00671 |
| 2018/0349863 | A1* | 12/2018 | Restum | G06Q 10/20 |

FOREIGN PATENT DOCUMENTS

| | | |
|---|---|---|
| CN | 202648947 | 1/2013 |
| DE | 19950215 | 6/2001 |
| DE | 10227677 A1 | 2/2003 |
| WO | 2007079527 A1 | 7/2007 |
| WO | 2014062939 A1 | 4/2014 |

OTHER PUBLICATIONS

Written Opinion of the International Searching Authority issued by the Canadian Intellectual Property Office in connection with International Patent Application No. PCT/CA2016/000144, dated Aug. 4, 2017, 4 pages.

* cited by examiner

METHOD AND APPARATUS FOR LOCATING A WEAR PART IN AN IMAGE OF AN OPERATING IMPLEMENT

BACKGROUND

1. Field

This disclosure relates generally to image processing and more particularly to processing of images for locating a wear part in an image of an operating implement.

2. Description of Related Art

Heavy equipment used in mines and quarries commonly includes an operating implement such as a loader, an excavator or a face shovel for digging, loading, manipulating, or moving material such as ore, dirt, or other waste. In many cases the operating implement has a sacrificial Ground Engaging Tool (GET) which often includes hardened metal teeth and adapters for digging into the material. The teeth and/or adapters may become worn, damaged, or detached during operation. Such teeth and/or adapters are commonly referred to as wear parts, and may also include other parts such as lip shrouds between teeth. These wear parts are subjected to a wearing due to contact with often abrasive material and are considered to be sacrificial components which serve to protect longer lasting parts of the GET.

In a mining or quarry operation, a detached wear part, e.g., a missing tooth or adapter, may damage downstream equipment for processing the ore. An undetected wear part can also cause safety risk since if the tooth enters an ore crusher, for example, the tooth may be propelled at a very high speed due to engagement with the crusher blades thus presenting a potentially lethal safety risk. In some cases the wear part may become stuck in the downstream processing equipment such as the crusher, where recovery causes downtime and represents a safety hazard to workers. The wear part may also pass through the crusher and may cause significant damage to other downstream processing equipment, such as for example longitudinal and/or lateral cutting of a conveyor belt. This may be a particular problem with loader or excavator teeth which are typically longer and narrower than shovel teeth. Additionally, knowing the current size and length of wear part may also be of importance in mining or quarry operations. Identifying the condition of wear parts such as their size (length) helps to predict when those wear parts need to be replaced or relocated to prevent damage to the operating implement and also to prevent operational inefficiencies due to unscheduled maintenance.

Camera based monitoring systems are available for monitoring wear parts on operating implements associated with heavy equipment such as front-end loaders, wheel loaders, bucket loaders, backhoe excavators, electric face shovels, and hydraulic face shovels. Such monitoring systems may use bucket tracking algorithms to monitor the bucket during operation, identify the teeth and other wear parts on the bucket, and provide a warning to the operation if a part of the operating implement becomes detached.

There remains a need for methods and apparatus for locating and/or identifying the condition of wear parts within an image of an operating implement associated with heavy equipment.

SUMMARY OF THE INVENTION

In accordance with one disclosed aspect there is provided a method for locating a wear part in an image of an operating implement associated with heavy equipment. The method involves capturing at least one image of the operating implement during operation of the heavy equipment, the image including a plurality of pixels each having an intensity value. The method also involves selecting successive pixel subsets within the plurality of pixels, and processing each pixel subset to determine whether pixel intensity values in the pixel subset meet a matching criterion indicating a likelihood that the pixel subset corresponds to the wear part. The matching criterion is based on processing a labeled set of training images during a training exercise prior to capturing the at least one image of the operating implement.

Processing each pixel subset may involve at least one of directly processing the pixel intensity values, extracting features associated with pixels in the pixel subset, and/or generating a histogram of oriented gradients for the pixel subset.

Processing each pixel subset may involve processing each pixel subset through a corresponding plurality of input nodes of a neural network, each input node having an assigned weight and being operable to produce a weighted output in response to the received intensity value.

The method may involve receiving the weighted outputs from the input nodes at a plurality of hidden nodes of the neural network, each hidden node having an assigned weight and being operable to produce a weighted output in response to the received weighted output from the input nodes.

The method may involve receiving the weighted outputs from the hidden nodes at one or more output nodes, the one or more output nodes having an assigned weight and being operable to produce a weighted output in response to the weighted outputs received from the hidden nodes.

The plurality of hidden nodes comprise may include hidden nodes in one or more layers, each successive layer of nodes operating on the outputs produced by a preceding layer.

Capturing at least one image may involve capturing a sequence of images of the operating implement during operation, the one or more layers including a memory layer including nodes operable to cause results of the processing of previous images of the operating implement to configure the neural network for processing subsequent images of the operating implement.

Processing the labeled set of training images during the training exercise may involve processing labeled sets of sequential training images.

Determining whether pixel intensity values in the pixel subset meet the matching criterion may involve determining whether the weighted output exceeds a reference threshold.

Receiving the weighted outputs from the input nodes at a plurality of hidden nodes may involve receiving the weighted outputs from the input nodes at a first plurality of hidden nodes, and receiving weighted outputs from the first plurality of hidden nodes at a second plurality of hidden nodes, each of the second plurality of hidden nodes having a weight and being operable to produce a weighted output in response to the received weighted output from the first plurality of hidden nodes.

Processing each pixel subset may involve processing each pixel subset using a convolutional neural network having a plurality of layers including at least one convolution layer configured to produce a convolution of the pixels in each pixel subset, and processing the labeled set of training images may involve processing training images to cause the convolutional neural network to be configured to implement the matching criterion for producing a pixel classification output indicating whether pixels in the pixel subsets correspond to the wear part.

Producing the convolution may involve producing the convolution using a sparse kernel having entries separated by rows and columns of zero values.

Producing the convolution may involve producing the convolution using a sparse kernel having entries separated by a plurality of rows and a plurality of columns of zero values.

The convolutional neural network may include a pooling layer configured to process the convolution to provide a plurality of pooling outputs, each pooling output being based on values associated with a plurality of pixels in the convolution.

The pooling layer may implement one of a max-pooling, an average pooling, and a stochastic pooling process.

The method may involve resampling the image to produce a resampled plurality of pixels and processing using the convolutional neural network may involve processing the resampled plurality of pixels, the convolutional neural network having been configured to implement the matching criterion using a correspondingly resampled plurality of training images.

Resampling the pixel data may involve at least one of up-sampling the image and down-sampling the image to produce the resampled plurality of pixels.

Capturing at least one image may involve capturing a sequence of images of the operating implement during operation and the convolutional neural network may include at least one memory layer operable to cause results of the processing of previous images of the operating implement to configure the convolutional neural network for processing subsequent images of the operating implement for producing a pixel classification output for the sequence of images.

Processing the labeled set of training images during the training exercise may involve processing labeled sets of sequential training images.

The labeled training set of images may include a set of images that have been labeled by a user.

The labeled training set of images may include a set of images that have been labeled by a computer implemented labeling process.

The training images may include images of various examples of the wear part labeled as including the wear part, and other images labeled as not including the wear part.

Selecting successive pixel subsets within the plurality of pixels may further involve processing the plurality of pixels to determine whether the operating implement is present in the image, and if the operating implement is present in the image, restricting the plurality of pixels to pixels within a region of interest that includes the operating implement prior to selecting successive pixel subsets within the plurality of pixels.

Processing the plurality of pixels to determine whether the operating implement is present in the image may involve selecting at least one pixel subset within the plurality of pixels, processing the at least one pixel subset to determine whether pixel intensity values in the at least one pixel subset meet an operating implement matching criterion indicating a likelihood that the operating implement is within the at least one pixel subset, and the operating implement matching criterion may be based on processing a labeled set of training images during a training exercise prior to capturing the at least one image of the operating implement.

Selecting successive pixel subsets within the plurality of pixels may involve one of selecting successive pixel subsets having a fixed predetermined size, and calculating a pixel subset size based on the captured image.

The matching criterion may include a plurality of weights corresponding to pixels within the pixel subset and processing each pixel subset may involve for each pixel in the pixel subset, calculating a product of the pixel intensity and the corresponding weight to determine a weighted output for the pixel, and determining whether the pixel subset meets the matching criterion by determining whether a combination of the weighted outputs for the pixel subset exceed a threshold.

Determining whether the weighted outputs for the pixel subset exceed a threshold may involve combining the determined weighted outputs for the pixel subset, determining whether the combined weighted output exceeds a threshold.

Capturing the at least one image may involve capturing a plurality of images of the operating implement during operation of the heavy equipment and the selecting and processing of pixel subsets within the plurality of pixels may be performed for each image and the method may further involve determining whether pixel intensity values in the pixel subsets meet a matching criterion in successive images of the plurality of images.

Capturing the at least one image may include capturing the at least one image using an image sensor having a wavelength sensitivity in at least one of the visible spectrum and the infrared spectrum.

The method may involve determining a dimensional attribute of the wear part.

The method may involve determining at least one of whether the condition of the wear part is satisfactory based on a pre-determined criteria, and a prediction of a time of failure of the wear part based on a rate of wear of the wear part over time.

In accordance with another disclosed aspect there is provided an apparatus for locating a wear part in an image of an operating implement associated with heavy equipment. The apparatus includes an image sensor for capturing at least one image of the operating implement during operation of the heavy equipment, the image including a plurality of pixels each having an intensity value. The apparatus also includes a processor circuit operably configured to select successive pixel subsets within the plurality of pixels. The processor circuit is also configured to process each pixel subset to determine whether pixel intensity values in the pixel subset meet a matching criterion indicating a likelihood that the pixel subset corresponds to the wear part. The matching criterion is based on processing a labeled set of training images during a training exercise prior to capturing the at least one image of the operating implement.

The image sensor may be an image sensor having a wavelength sensitivity in at least one of the visible spectrum and the infrared spectrum Other aspects and features will become apparent to those ordinarily skilled in the art upon review of the following description of specific disclosed embodiments in conjunction with the accompanying figures.

BRIEF DESCRIPTION OF THE DRAWINGS

In drawings which illustrate disclosed embodiments.

DETAILED DESCRIPTION

Figure 1:
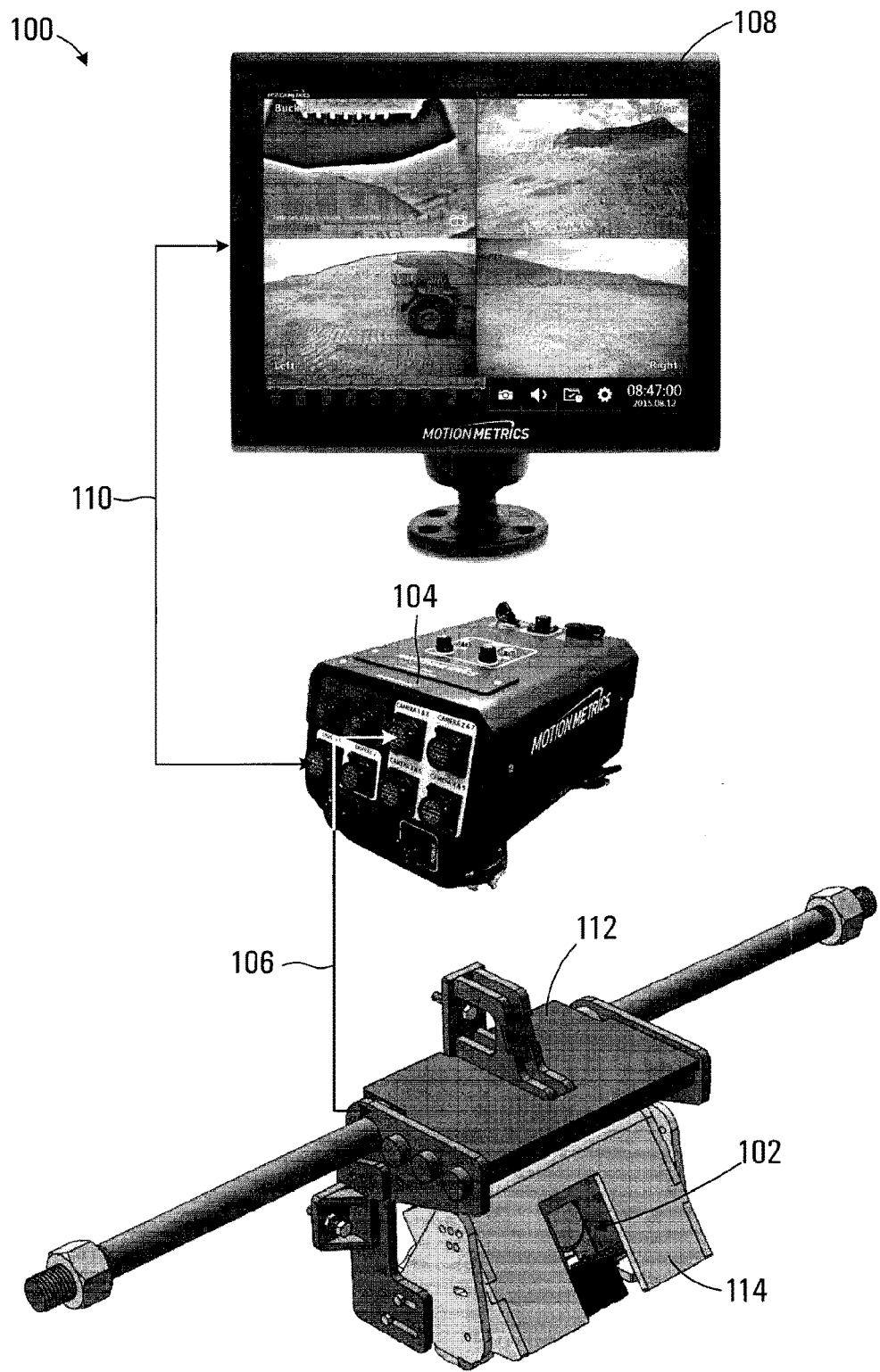
FIG. 1 is a schematic view of an apparatus for locating and/or detecting the condition of a wear part according to a first disclosed embodiment.

Referring to FIG. 1, an apparatus for locating a wear part and/or determining the condition of the wear part of an operating implement associated with heavy equipment is shown at 100. The apparatus 100 includes an image sensor 102 and a processor circuit 104. The image sensor 102 is in communication with the processor circuit 104 via a communications link 106. The apparatus 100 also includes a display 108, in communication with the processor circuit 104 via a communications link 110.

Figure 2:
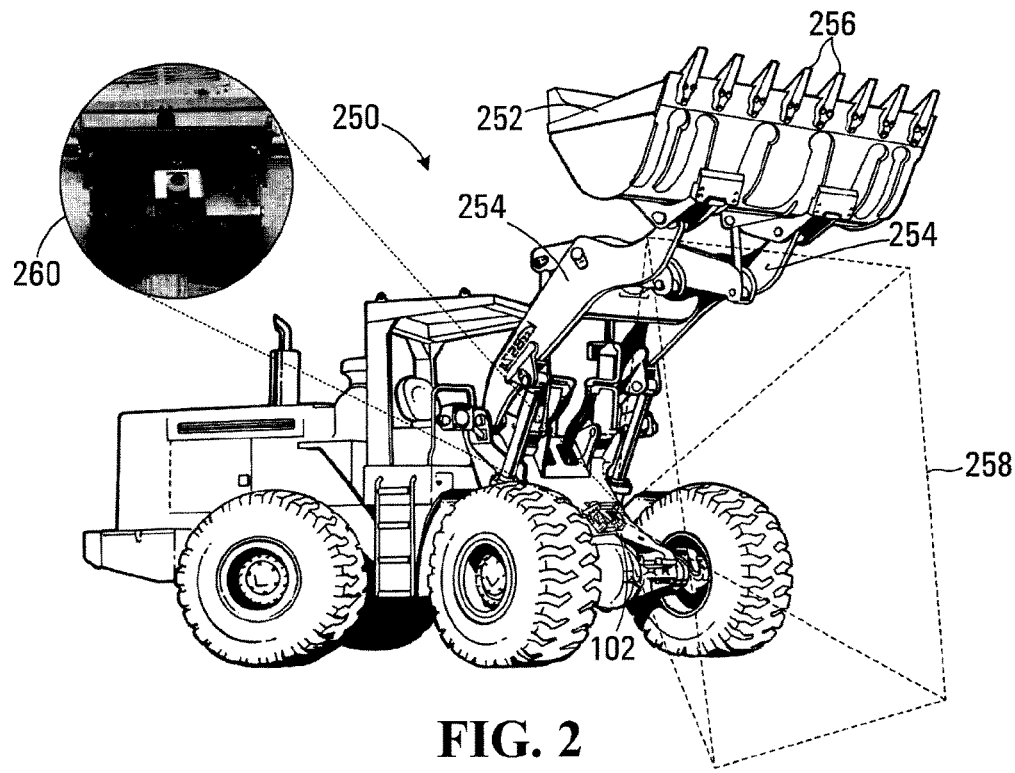
FIG. 2 is a perspective view of a wheel loader on which the apparatus shown in FIG. 1 has been implemented.

Referring to FIG. 2, in one embodiment the image sensor 102 is mounted on a wheel loader 250. The wheel loader 250 includes a bucket operating implement 252 carried on side-arms 254. The bucket 252 has a plurality of wearable teeth 256, which are subject to wear or damage during operation. The image sensor 102 is mounted generally between the side-arms and has an associated field of view 258. The teeth 256 on the bucket 252 will generally move into and out of the field of view 258 during operation. The mounted image sensor 102 is shown in more detail in an insert 260. In this embodiment the image sensor 102 is implemented as a thermal imaging sensor, which is sensitive to infrared wavelength ranges. Thermal imaging is particularly suitable for monitoring the teeth 256 of the wheel loader 250 shown in FIG. 2 since the image sensor 102 views the back of the bucket 252 and there is also less chance of ore getting stuck on the bucket and blocking the view of the teeth.

Referring back to FIG. 1, the image sensor 102 includes a mounting bracket 112 that mounts the sensor to the wheel loader 250 under the bucket operating implement 252. In general the bracket 112 is configured to mount to a specific loader type, in this case a Caterpillar™ wheel loader and may provide shock and vibration isolation for the image sensor 102. The image sensor 102 is protected from falling debris from the bucket 252 by a protective housing 114. In some embodiments a lens cleaning system (not shown) may be enclosed within the protective housing 114 for delivering high pressure washer fluid and/or a compressed air flow for cleaning the upward facing image sensor 102, which is exposed during operation.

Figure 3:
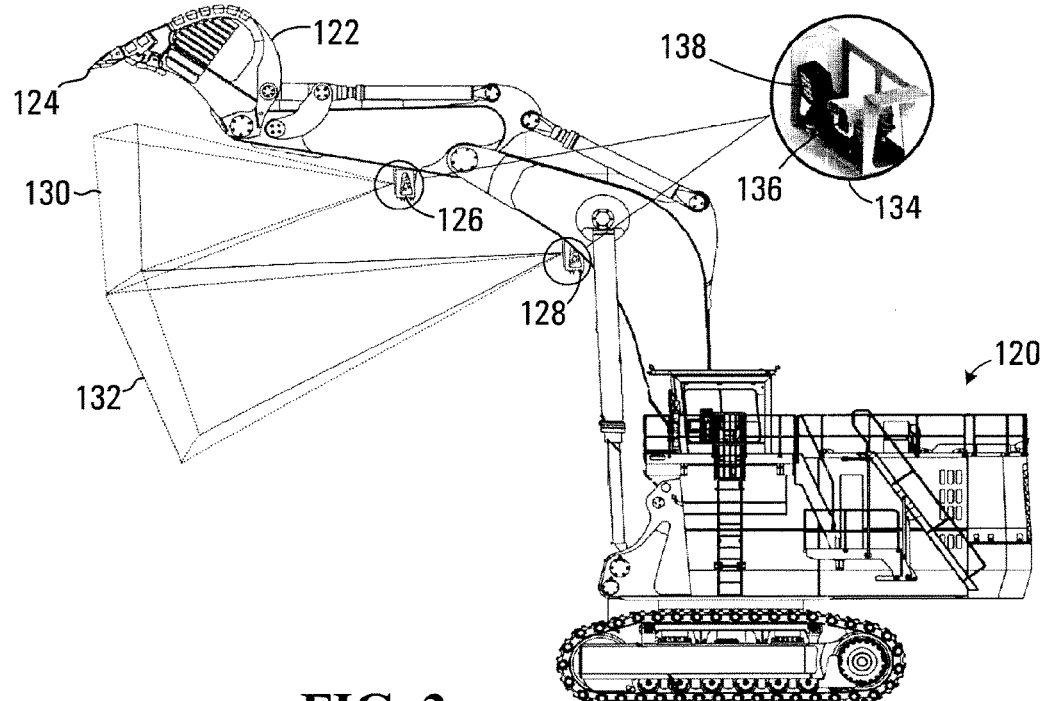
FIG. 3 is a perspective view of a backhoe excavator on which the apparatus shown in FIG. 1 may be implemented.

Referring to FIG. 3, a similar sensor to the sensor 102 may be installed on other heavy equipment, such as the backhoe excavator shown at 120. The backhoe 120 includes an excavator bucket 122 having teeth 124. In the embodiment shown two possible locations for the image sensor are shown at 126 and 128, each having a respective field of view 130 and 132. The image sensor 126, 128 is shown in more detail in the insert 134 and includes a visible spectrum image sensor 136 and an illumination source 138 for illuminating the field of view 130 or 132.

Figure 4:
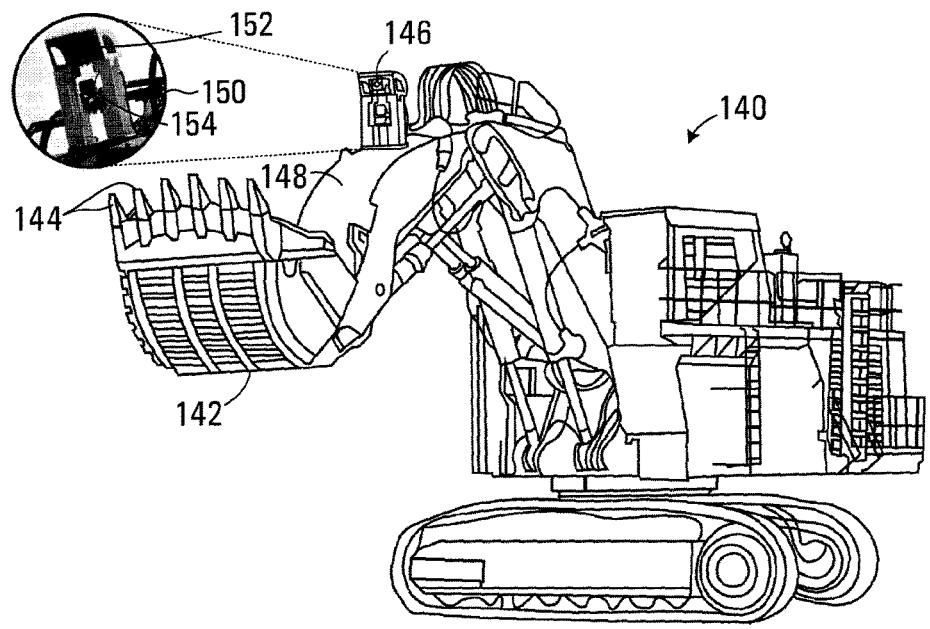
FIG. 4 is a perspective view of a hydraulic face shovel on which the apparatus shown in FIG. 1 may be implemented.

Referring to FIG. 4 a similar sensor to the sensor 102 may alternatively be installed on a hydraulic face shovel shown at 140, which includes an excavator bucket 142 having teeth 144. An image sensor 146 is installed on a linkage 148 that supports the excavator bucket 142. The image sensor 146 is shown in more detail in the insert 150 and includes a visible spectrum image sensor 152 and an illumination source 154 for illuminating the excavator bucket 142

Figure 5:
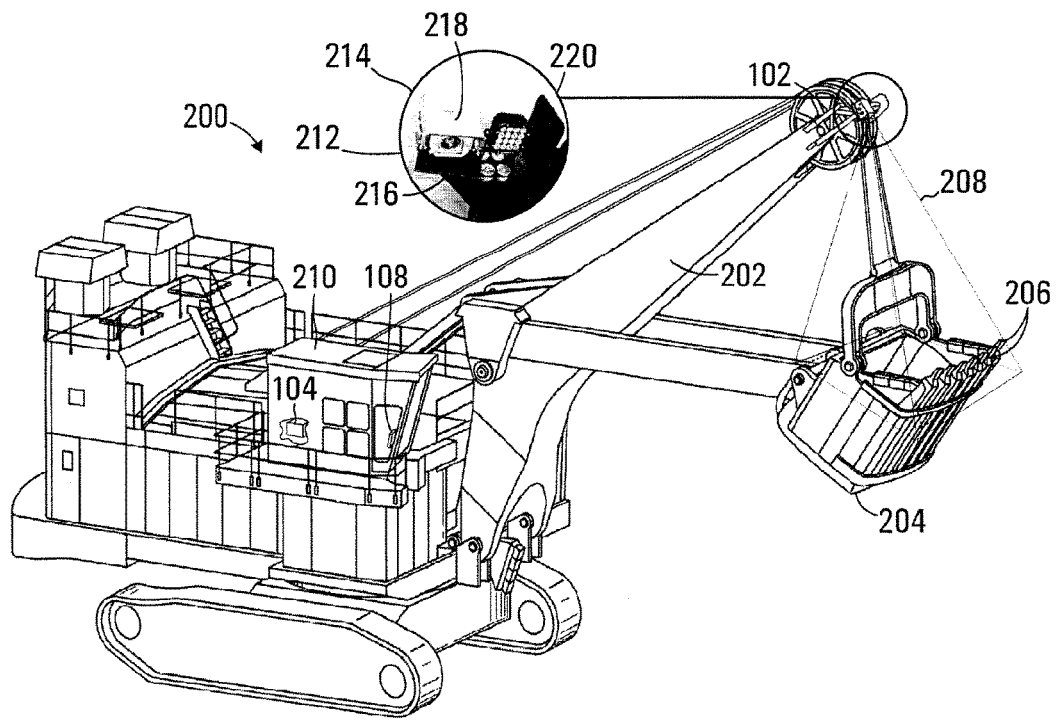
FIG. 5 is a perspective view of an electric cable shovel on which the apparatus shown in FIG. 1 has been implemented.

Referring to FIG. 5, in another embodiment an image sensor 212 may be mounted on an electric shovel 200. The image sensor 212 is mounted at the end of a boom 202 of the shovel 200 and is oriented to provide images of an operating implement of the shovel, in this case a bucket 204. The image sensor 212 is shown in more detail in the insert 214 and includes a mounting bracket 216, a housing 218, and in this embodiment, an illumination source 220. In this embodiment the image sensor 212 has a wavelength sensitivity in the visible spectrum but in other embodiments a thermal sensor may be implemented and the illumination source 220 may be omitted. The mounting bracket 216 may be configured to provide vibration and/or shock isolation for the image sensor 212 and illumination source 220. The bucket 204 includes a plurality of teeth 206, which in general for an electric shovel are configured as replaceable wear parts. The image sensor 212 has a field of view 208 (indicated by broken lines) that includes the bucket 204 and teeth 206. In general, the field of view 208 is configured such that the bucket 204 remains in view while the shovel 200 is excavating an ore face during mining operations. In the embodiment shown in FIG. 5, the processor 104 and display 108 are both located within a cabin 210 of the shovel 200. The display 108 is located to provide feedback to an operator of the shovel 200.

In some embodiments, the apparatus 100 may also include an illumination source (not shown) for illuminating the field of view during low light operating conditions. In embodiments where the image sensor 102 or 212 is sensitive to infrared wavelengths, illumination may not be required due to the of teeth becoming warm during operation and providing good infrared image contrast even in low light conditions.

In other embodiments, the image sensor 102 may be mounted on other heavy equipment, such as hydraulic shovels, front-end loaders, wheel loaders, bucket loaders, and backhoe excavators.

Processor Circuit

Figure 6:
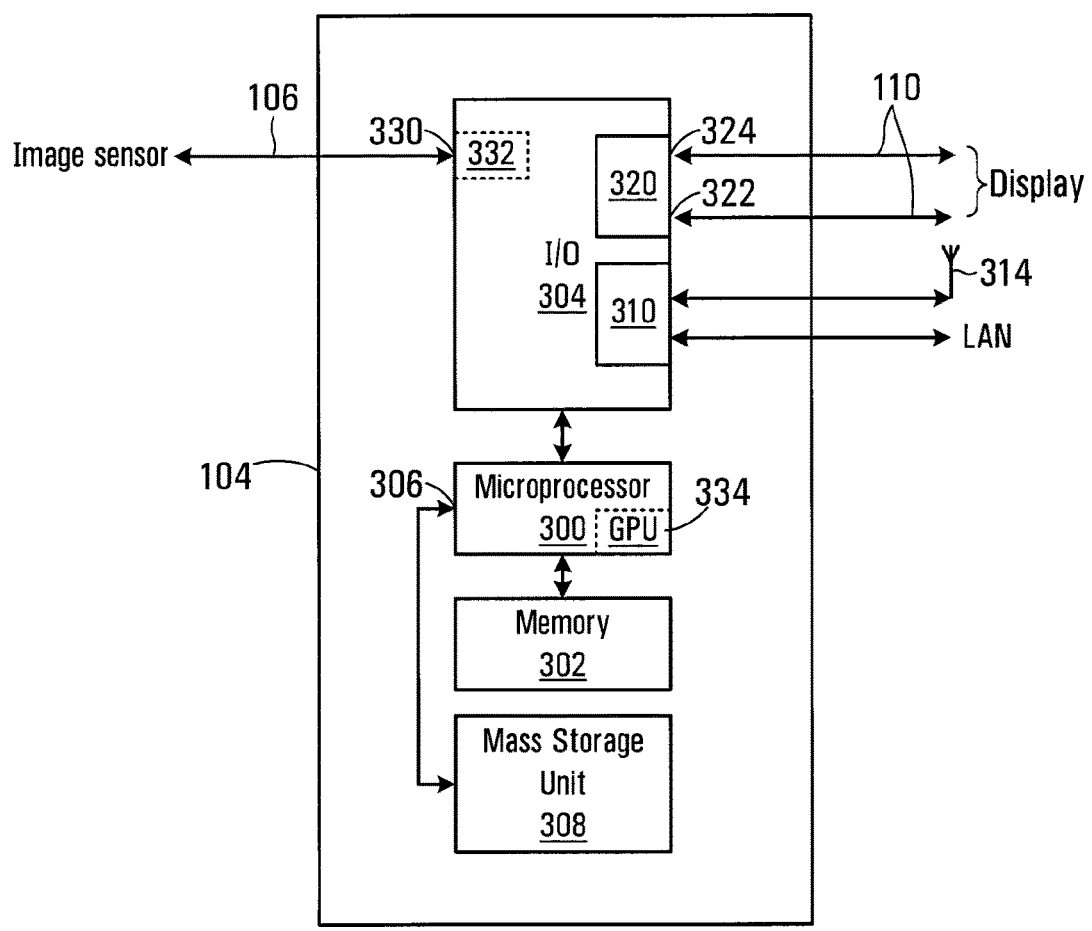
FIG. 6 is a block diagram of a processor circuit of the apparatus shown in FIG. 1.

A block diagram of the processor 104 is shown in FIG. 6. Referring to FIG. 6, the processor circuit 104 includes a microprocessor 300, a memory 302, and an input output port (I/O) 304, all of which are in communication with the microprocessor 300. In one embodiment the processor circuit 104 may be optimized to perform image processing functions. The microprocessor 300 may include a graphics processing unit 334 (GPU) for accelerating image processing tasks carried out by the processor circuit 104. The microprocessor 300 also includes an interface port 306 (such as a SATA interface port) for connecting a mass storage unit 308 such as a hard drive or solid state drive. Program codes for directing the microprocessor 300 to carry out functions related to locating teeth within images of the bucket 204 or 252 may be stored in the memory 302 or the mass storage unit 308.

The I/O 304 may also include a network interface 310 having a port for connecting to a network such as the internet or other local area network (LAN). Alternatively or additionally the (I/O) 304 may include a wireless interface 314 for connecting wirelessly to a wireless access point for accessing a network. The local network and/or wireless network may be implemented on the electric shovel 200 and may be used as the communications links 106 and 110 connecting between the image sensor 102, the processor circuit 104 and the display 108. Alternatively, the communications links 106 and 110 may be implemented using cables. Program codes may be loaded into the memory 302 or mass storage unit 308 using either the network interface 310 or wireless interface 314, for example.

The I/O 304 also includes a display interface 320 having a display signal output 322 for producing display signals for driving the display 108. In one embodiment display 108 may be a touchscreen display and the display interface 320 may also include a USB port 324 in communication with a touchscreen interface of the display for receiving input from an operator. The I/O 304 may also have additional USB ports (not shown) for connecting a keyboard and/or other peripheral interface devices.

The I/O 304 further includes an input port 330 for receiving image signals from the image sensor 102. In one embodiment the image sensor 102 may be a digital camera and the image signal port 330 may be an IEEE 1394 (firewire) port, USB port, or other suitable port for receiving image signals. In other embodiments, the image sensor 102 may be an analog camera that produces NTSC or PAL video signals, for example, and the image signal port 330 may be an analog input of a framegrabber 332.

In other embodiments (not shown), the processor circuit 104 may be partly or fully implemented using a hardware logic circuit including discrete logic circuits and/or an application specific integrated circuit (ASIC), for example.

Process for Locating the Wear Part

Figure 7:
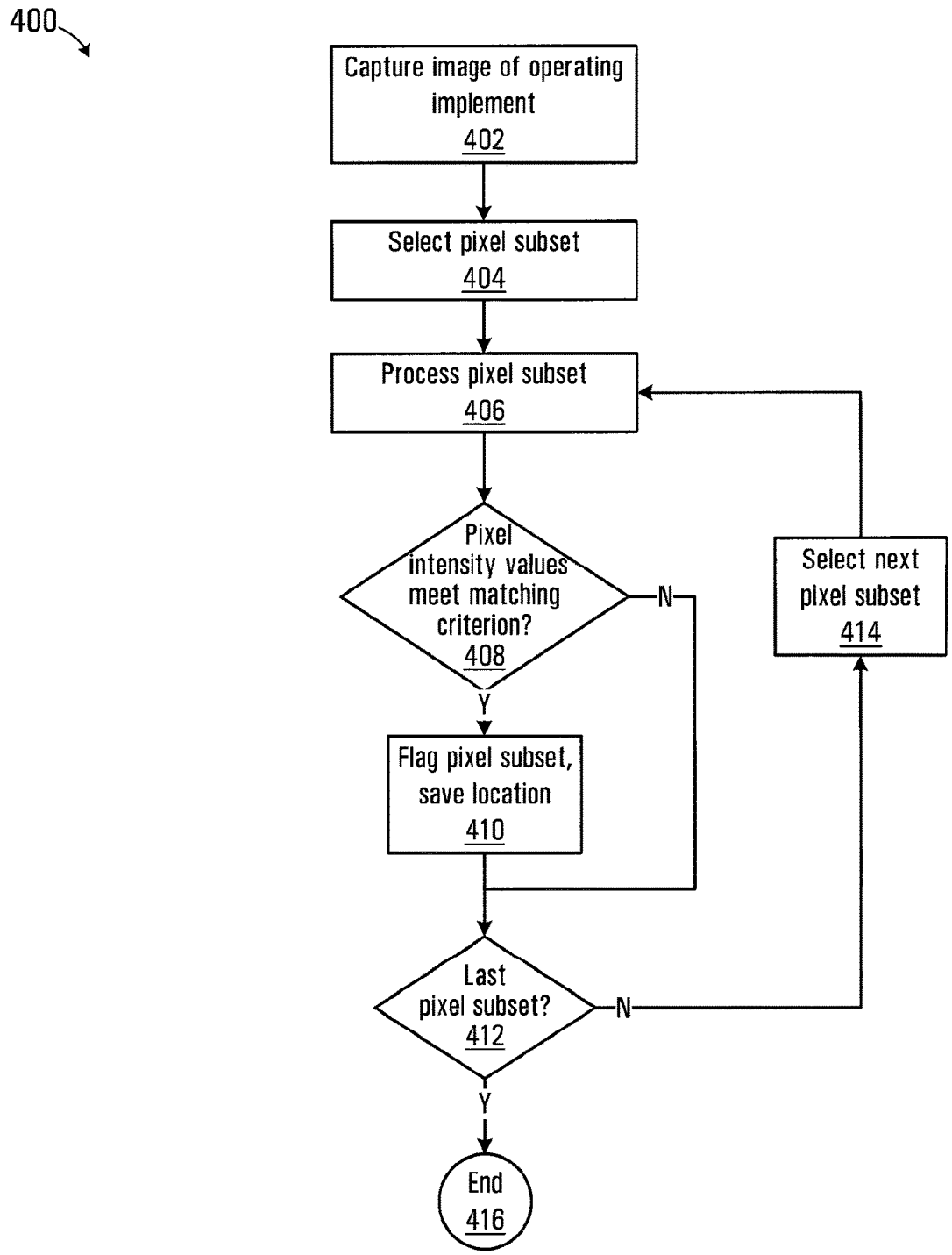
FIG. 7 is a flowchart depicting blocks of code for directing the processor circuit of FIG. 6 to locate a wear part.

Referring to FIG. 7, a flowchart depicting blocks of code for directing the processor circuit 104 to locate a wear part, such as teeth 256 of the bucket operating implement 252 or teeth 206 of the bucket 204, in an image of an operating implement is shown generally at 400. The blocks generally represent codes that may be read from the memory 302 or mass storage unit 308 for directing the microprocessor 300 to perform various functions. The actual code to implement each block may be written in any suitable programming language, such as C, C++, C#, and/or assembly code, for example.

The process 400 begins at block 402, which directs the microprocessor 300 to cause the image sensor 102 to capture an image of the operating implement. An example of a captured image of a portion of the bucket operating implement 252 shown in FIG. 3 is shown at 500 in FIG. 8. The image 500 includes a plurality of pixels each having an intensity value representing the bucket 252. In the embodiment shown the image 500 has been captured using a thermal imaging system sensitive to infrared wavelength ranges. Heating of the teeth due to friction arising from engagement of the wear parts with ore face being excavated during operations may provide a thermal image under almost any lighting conditions. In other embodiments the image may be captured using a visible wavelength imaging system. The image 500 includes background areas 502 that do not include any objects, areas 504 and 506, which include objects that are not part of the operating implement, and an operating implement 252. In the image 500, the areas 502 and 504 and the bucket 252 have contrasting pixel intensities, which will in general depend on the level of illumination and other factors. Generally, the number of pixels in the image will be large and the size of each pixel will be small (for example 75 pixels per inch of displayed image).

Block 404 then directs the microprocessor 300 to select a pixel subset 510 within the plurality of pixels. For sake of illustration the pixel subset 510 is shown including only 60 pixels, but in practice the pixel subset would include well in excess of 60 pixels depending on the size of the wear part to be located within the image 500. In general the pixel subset 510 is sized slightly larger than the wear part such that the subset will include the wear part such as the tooth 256 along with a portion of the background area 502 and the area of the operating implement 252.

The process then continues at block 406, which directs the microprocessor 300 to process the pixel subset 510. In this embodiment, processing of the pixel subset 510 involves determining at block 408, whether pixel intensity values in the pixel subset meet a matching criterion. In one embodiment the processing may be in accordance with actual pixel intensity values. In other embodiments other intensity based information may be extracted, for example by dividing the image into connected cells and compiling a histogram of gradient directions or edge directions within each cell.

If at block 406, the pixel subset 510 meets the matching criterion, block 408 directs the microprocessor 300 to block 410 and the pixel subset is flagged as having a high likelihood of corresponding to the wear part i.e. one of the teeth 256. Block 410 also directs the microprocessor 300 to save the location of the pixel subset 510. The location of the pixel subset 510 may be saved by saving the pixel row and column numbers within the image 500 for a reference pixel within the flagged pixel subset. For example, a center pixel of the subset 510 may be saved as indicating the location of the wear part. Alternatively the row and column of the uppermost left hand corner may be used to reference the location of the pixel subset 510. Block 410 then directs the microprocessor to block 412. If at block 408 the pixel subset 510 does not meet the matching criterion the microprocessor 300 is directed to block 412.

Block 412 directs the microprocessor 300 to determine whether further pixel subsets are still to be processed, in which case the microprocessor is directed to block 414 and is directed to select a successive pixel subset for processing, which involves moving the pixel subset 510 over in the direction of the arrow 512. In one embodiment successive pixel subsets are horizontally overlapped by between about 70%-85% to provide for reliable wear part detection within the image. In other embodiments a greater or lesser overlap between pixel successive subsets may be implemented in accordance with a desired tradeoff between reliable detection and improved processing time per image. For example, where processing speed is not an issue, successive pixel subsets may be spaced apart by only a single pixel.

Block 412 then directs the microprocessor 300 back to block 406, and blocks 406 and 408 are repeated for each successive pixel subset 510. Once the pixel subset 510 reaches a right hand edge of the image 500, the pixel subset may be moved down (i.e. to the location of the pixel subset 510a) and may be moved either back to the left edge of the image to continue in the direction 512. Alternatively, the pixel subset 510 may be moved from the right edge toward the left edge of the image 500 in the direction indicated by the arrow 514. In one embodiment successive pixel subsets are vertically overlapped by between about 70%-85% to provide for reliable wear part detection within the image, while in other embodiments a greater or lesser vertical overlap between pixel successive subsets may be implemented. If at block 412 the microprocessor 300 determines that no further pixel subsets are to be processed, the process ends at block 416. If no pixel subsets are flagged at block 410, then the image 500 is considered not to include the wear part.

Matching Criterion

Figure 9:
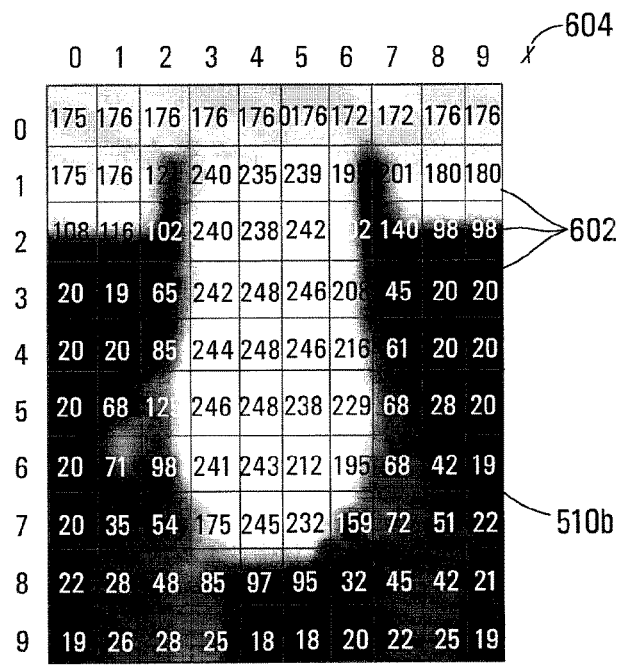
FIG. 9 is a depiction of a pixel subset associated with a portion of the image shown in FIG. 8.
Figure 10:
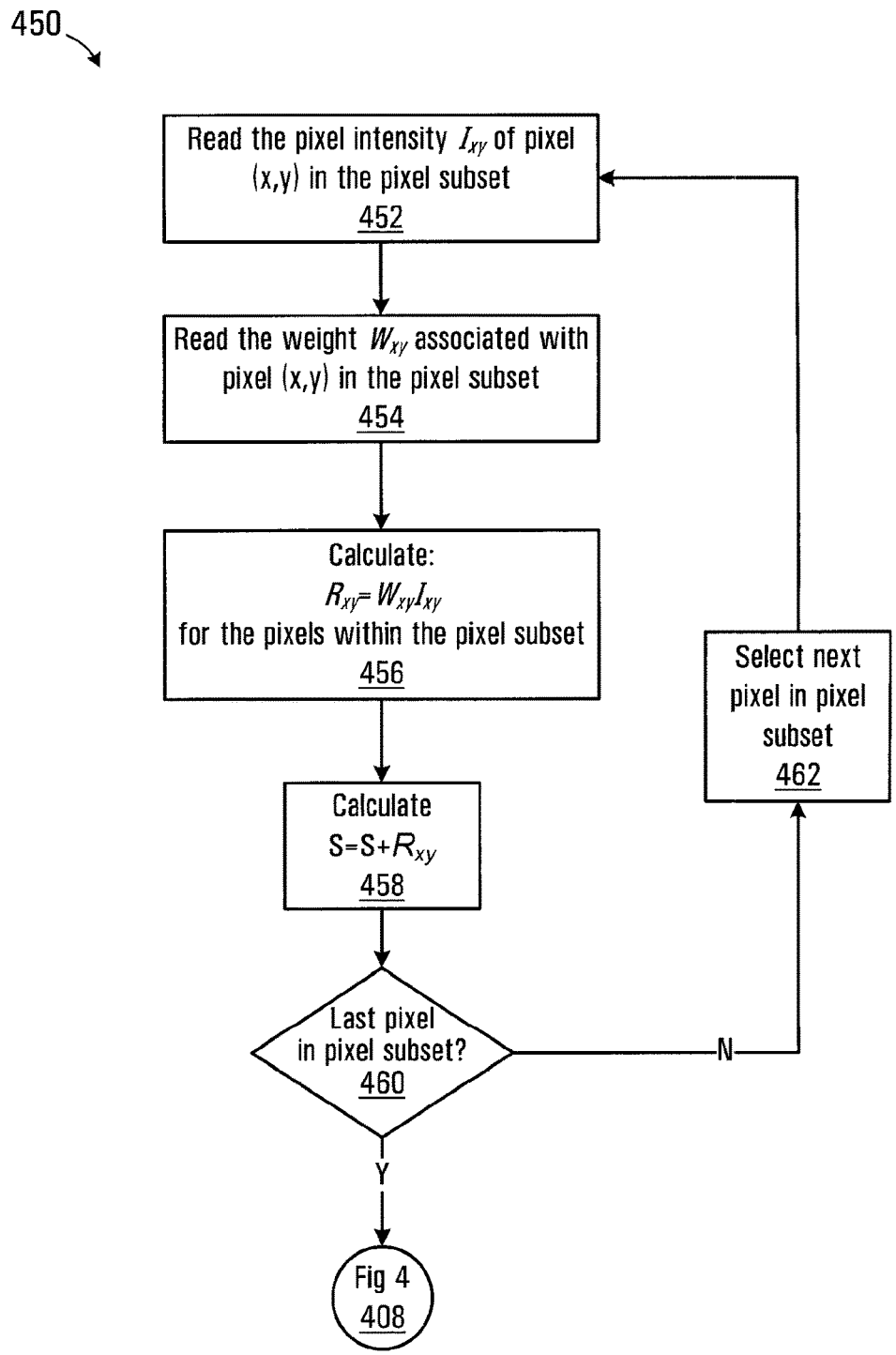
FIG. 10 is a flowchart depicting blocks of code for directing the processor circuit of FIG. 6 to determine whether the pixel subset of FIG. 9 meets a matching criterion.

Referring to FIG. 10, a process 450 for making the determination at block 408 of whether the pixel subset 510 meets the matching criterion is described for the pixel subset 510b. The process embodiment is described for a pixel subset 510b in the image 500 that is generally centered over the tooth 256. The pixel subset 510b is shown in enlarged view in FIG. 9 along with a portion of the image 500 that includes the tooth 256. Referring to FIG. 9, the pixels 602 in the pixel subset 510b are numbered in FIG. 9 using indices x (604) and y (606) for ease of reference. Each pixel 602 within the pixel subset 510b has an associated weight $W_{xy}$, which for sake of illustration is an integer value between 0 and 256 in the embodiment shown. In this embodiment the weights $W_{xy}$ are predetermined and saved in the memory 302 of the processor circuit 104 shown in FIG. 7.

The process 450 begins at block 452, which directs the microprocessor 300 to read the pixel intensity $I_{xy}$ of the first pixel (0,0) in the pixel subset 510b. Block 454 then directs the microprocessor 300 to read the weight $W_{xy}$ associated with the first pixel (0,0) in the pixel subset 510b from the memory 302 of the processor circuit 104.

The process then continues at block 456, which directs the microprocessor 300 to calculate the product of the pixel intensity $I_{xy}$ and the weight $W_{xy}$. Block 458 then directs the microprocessor 300 to accumulate a sum S of the values of $R_{xy}$. In this embodiment the products of $I_{xy}$ and $W_{xy}$ are thus combined by taking a simple sum over the pixels 602 in the pixel subset 510b. If at block 460, the pixel (x,y) was not the last pixel (i.e. pixel (5,9)) in the subset, the microprocessor 300 is directed to block 462 where the next pixel is selected (for example pixel (0,1)). Block 462 then directs the microprocessor 300 back to block 452, and blocks 452 to 460 are repeated for pixel (0,1). If at block 460, the pixel (0,1) was the last pixel (i.e. pixel (5,9)) in the pixel subset 510b, the process 450 is completed and the process returns to block 408 in FIG. 7. Block 458 thus directs the microprocessor 300 to accumulate a sum of the products $\Sigma R_{xy}$ of pixel intensity $I_{xy}$ and the weights $W_{xy}$ for each of the pixels 602 in the pixel subset 510b.

In this embodiment, at block 408 the $\Sigma R_{xy}$ value produced by the process 450 may be compared to a threshold value, and if the threshold is exceeded then the pixel subset 510b is considered to correspond to a tooth and would then be flagged accordingly in the process 400. When the pixel subset 510b is located over a background area such as areas 502, 504, or 506, the correlation between higher weights $W_{xy}$ in the pixel subset will generally be poor, resulting in lower values of $\Sigma R_{xy}$. However, when the pixel subset 510b has a tooth located within the pixel subset, the higher weights $W_{xy}$ assigned to certain pixels in the pixel subset when multiplied by higher pixel intensities produce higher values of $\Sigma R_{xy}$. The threshold may be empirically selected to provide a desired confidence level for identifying tooth images within the image 500. Alternatively, the threshold may be dynamically selected based on properties of the image 500.

In practice, if there is a significant degree of overlap between successive pixel subsets 510, several overlapping pixel subsets may result in $\Sigma R_{xy}$ values above the threshold and would thus be flagged as including a tooth. In this case, an additional step may be added to the process 400 to select only one pixel subset out of a plurality of overlapping pixel subsets having the highest $\Sigma R_{xy}$ value to avoid multiple detection of the same tooth within the image 500.

Generating Matching Criterion

Figure 11:
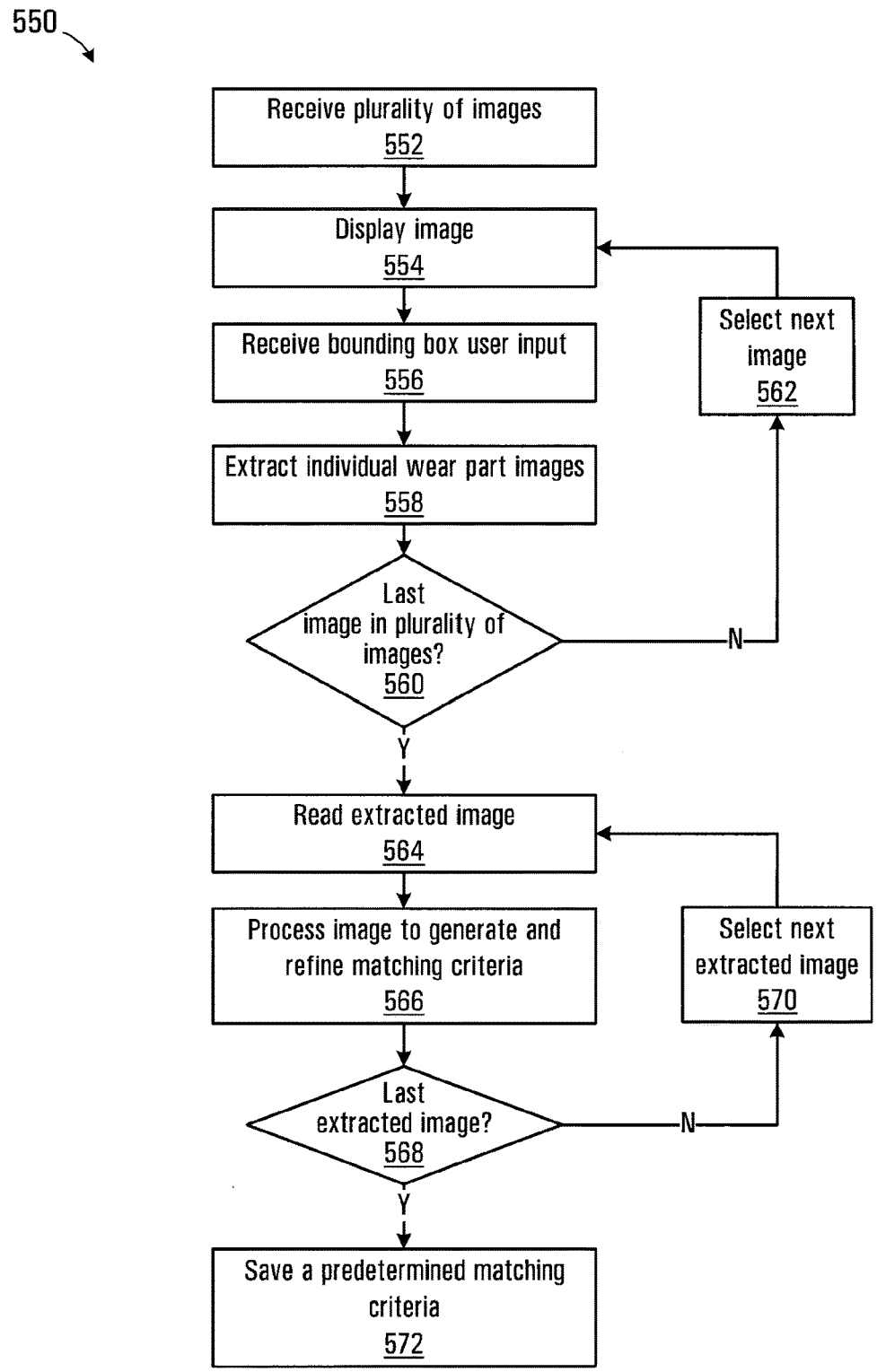
FIG. 11 is a flowchart depicting blocks of code for directing the processor circuit of FIG. 6 to implement a supervised learning process.

In one embodiment the matching criterion may be generated using a supervised learning process based on images of the wear part. An embodiment of a supervised learning process is shown in FIG. 11 at 550. While the process 550 may be implemented on the processor circuit 104 shown in FIG. 6, it would generally be convenient to use a desktop computer for performing the learning process. The process 550 begins at block 552, which directs the computer to receive a plurality of images. The images may be conveniently stored in a sub-directory on a hard drive of the computer. The plurality of images may include various examples of the wear part being identified, such as tooth images from various different buckets for shovels and/or other heavy operating equipment including teeth from different locations on a particular bucket. The plurality of images may also include images that do not correspond to the wear part, and preferably images of portions of the shovel or other heavy equipment that could be mistaken for a wear part.

Figure 12:
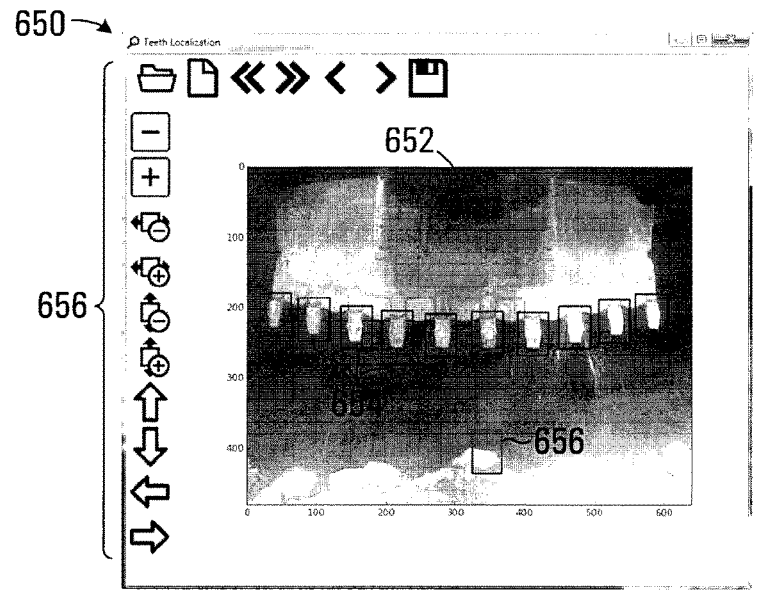
FIG. 12 is a screenshot of a screen generated by the processor circuit of FIG. 6 during the supervised learning process of FIG. 11.

Block 554 then directs the computer to display the first image. Referring to FIG. 12, a screenshot generated by a supervised learning application run on the desktop computer is shown at 650. The screenshot 650 includes a displayed image 652 of a bucket of a loader (such as the loader 250 shown in FIG. 3) having a plurality of teeth. The process 550 then continues at block 556, which directs the computer to receive user input of one or more bounding boxes that identify individual teeth in the image. A plurality of such bounding boxes are shown in the screenshot 650, each surrounding a respective tooth. The supervised learning application provides a set of control buttons that allow the user to locate the boxes around each tooth using drag and drop functions. The control buttons also provide access to functions for adjusting each box so that a majority of the area of the box is occupied by the tooth while some space remains below and to the sides of the tooth.

Block 558 then directs the computer to extract the individual tooth images on the basis of the user input bounding boxes 654. The pixels within each bounding box 654 may be saved as a separate image file and either named or grouped in a directory to indicate that the images have been labeled by the user as teeth images.

Block 560 then directs the computer to determine whether the last image in the plurality of images has been processed. If images remain to be processed, the process continues at block 562, where the computer is directed to select the next image. Blocks 554-560 are then repeated for each successive image until the supervised learning has been completed and all of the teeth in the plurality of images have been extracted and labeled as tooth images.

The process 550 then continues at block 564, which directs the computer to read each extracted images. Block 566 then directs the computer to process the image to generate and refine the matching criterion based on the image. Block 568 directs the computer to determine whether further extracted images remain to be processed, in which case block 570 directs the computer to select the next image for processing. If at block 568 all of the extracted images have been processed, the computer is directed to block 572 and the matching criterion is saved as the matching criterion for use in the process 400 shown in FIG. 7.

In one embodiment, the supervised learning may further involve providing images that are labeled as not including the wear part. For example, referring back to FIG. 12, portions 656 of the image 652 may be selected by the user or may be randomly selected and labeled as non-teeth images. The non-wear part images may be used to generate a matching criterion that is less sensitive to generating false positive wear part identifications within the image.

Neural Network Implementation

Figure 13:
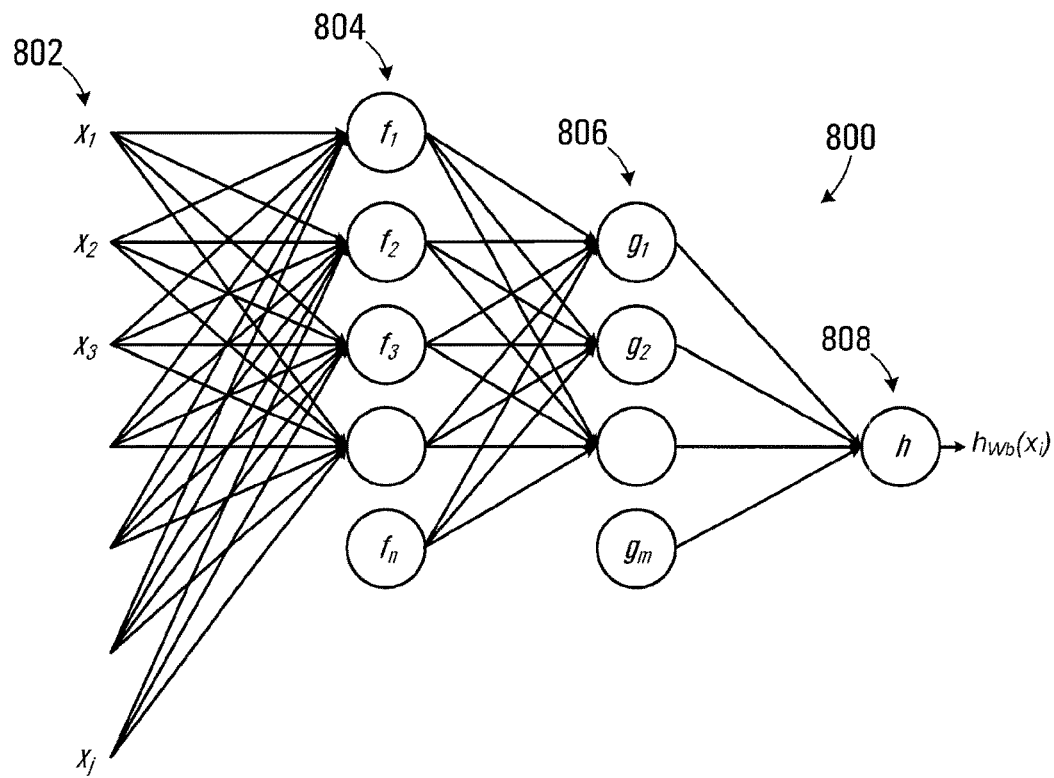
FIG. 13 is a schematic view of an artificial neural network for implementing a portion of the process shown in FIG. 7.

In one embodiment the processing of the pixel subset at block 406 in FIG. 7 may be implemented using an artificial neural network. Referring to FIG. 13, an example of a small neural network is shown at 800. The neural network 800 includes an input layer 802 including inputs $x_1, x_2, x_3, \ldots x_j$. The inputs $x_j$ may represent pixel intensity values for pixels within the pixel subset, for example. The neural network 800 also includes one or more hidden layers each including a plurality of nodes or neurons. In this case the neural network 800 includes hidden layers 804 and 806. Each neuron in the hidden layer 804 has a respective activation function $f_1, f_2, f_3, \ldots f_n$, where the activation functions have the form:

$$f(\Sigma W x_j + b), \quad \text{Eqn 1}$$

and where W is a weight assigned to each neuron, and a bias b. Each layer of the neural network may or may not have a bias, which is a neuron having a constant value of "1" and is connected it to each neuron in the layer. The weights W of these bias neurons also need to be determined during a training exercise. If the bias is not used then the value of "b" in Eqn 1 is set to zero.

Similarly the hidden layer 806 includes neurons having activation functions $g_1, g_2, \ldots g_n$. The activation function for each of the neurons in the layer 804 produce an output in response to the inputs $x_j$ which are received by neurons in the hidden layer 806. The activation functions for each of the neurons in the layer 806 similarly produce an output in response to the inputs from neurons in the layer 804. In other embodiments the hidden layers 804 and 806 may include a larger number of neurons, each having an activation function.

The neural network 800 also includes an output layer 808 including a neuron having a activation function h, which may have a similar form to the activation function above and produces an output result $h_{W,b}(x_i)$.

By selecting appropriate weights W and b for the neurons in the layers 804, 806, and 808, the neural network 800 can be configured to produce an output result that indicates whether an input pixel subset represents a specific wear part or not. Evaluation of the output result for any particular input pixel subset captured during operation would thus involve evaluating the activation functions $f_1, f_2, f_3, \ldots f_n$, $g_1, g_2, \ldots g_n$, and h using the stored values of W and b to determine outputs for the layers 804-808. The output result $h_{W,b}(x_i)$ would then indicate whether the input pixel subset has been determined to correspond to the wear part or not. In this case the output result may be a confidence value which can be compared with a threshold to convert the result into a binary "0" or "1" indicating whether the wear part has been located or not.

In the above embodiment the processing at block 566 in FIG. 11 may be implemented by training the neural network 800 using a plurality of pixel subsets representing the specific wear part such as a tooth. The training may be performed prior to capturing images of the operating implement during operation, and may be saved in the memory as a set of data including the weights W and b. Selection of appropriate weights may involve a supervised learning process. In one embodiment, the process may involve a user selecting a variety of pixel subsets which are labelled as including the wear part and then feeding the pixel subsets through the neural network 800. The desired output for each image may be designated as y, where in this case y=1 indicates the pixel subset includes an identified wear part while y=0 would indicate that the pixel subset does not include a wear part. A cost function for optimizing the neural network 800 may then be written as:

$$J(W, b, x_i, y_i) = \frac{1}{2} \|h_{W,b}(x_i) - y_i\|^2, \quad \text{Eqn 2}$$

which is a half squared error cost function. For a training set having m pixel subsets, the overall cost function is:

$$J(W, b) = \left[\frac{1}{m}\sum_{i=1}^{m} J(W, b, x_i, y_i)\right] \quad \text{Eqn 3}$$

Other terms may be added to the cost function above, such as a regularization term that decreases the magnitude of the weights to prevent over fitting. The cost function J is then minimized using a minimization algorithm such as a batch gradient descent minimization that determines values for W and b that provide a closest match between the output result $h_{W,b}(x_i)$ and the assigned y value for each of the training pixel subsets.

Various other training approaches may be implemented for predetermining the weights W and b associated with the matching criterion. In some embodiments the matching criterion may be completely predetermined during the training exercise. In other embodiments, the matching criterion may be partially predetermined during a training exercise and modified during operation of the heavy equipment in a recurrent neural network implementation as described later herein.

Alternative Implementation

Figure 8:
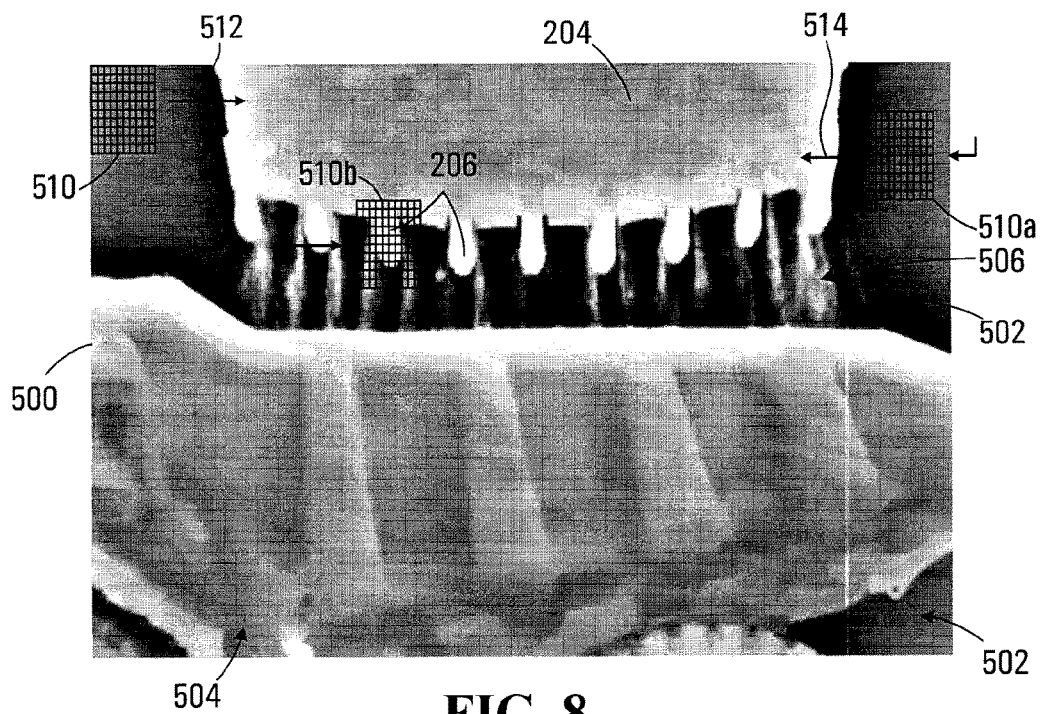
FIG. 8 is an example of a captured image of a portion of a bucket of the wheel loader shown in FIG. 3.
Figure 14:
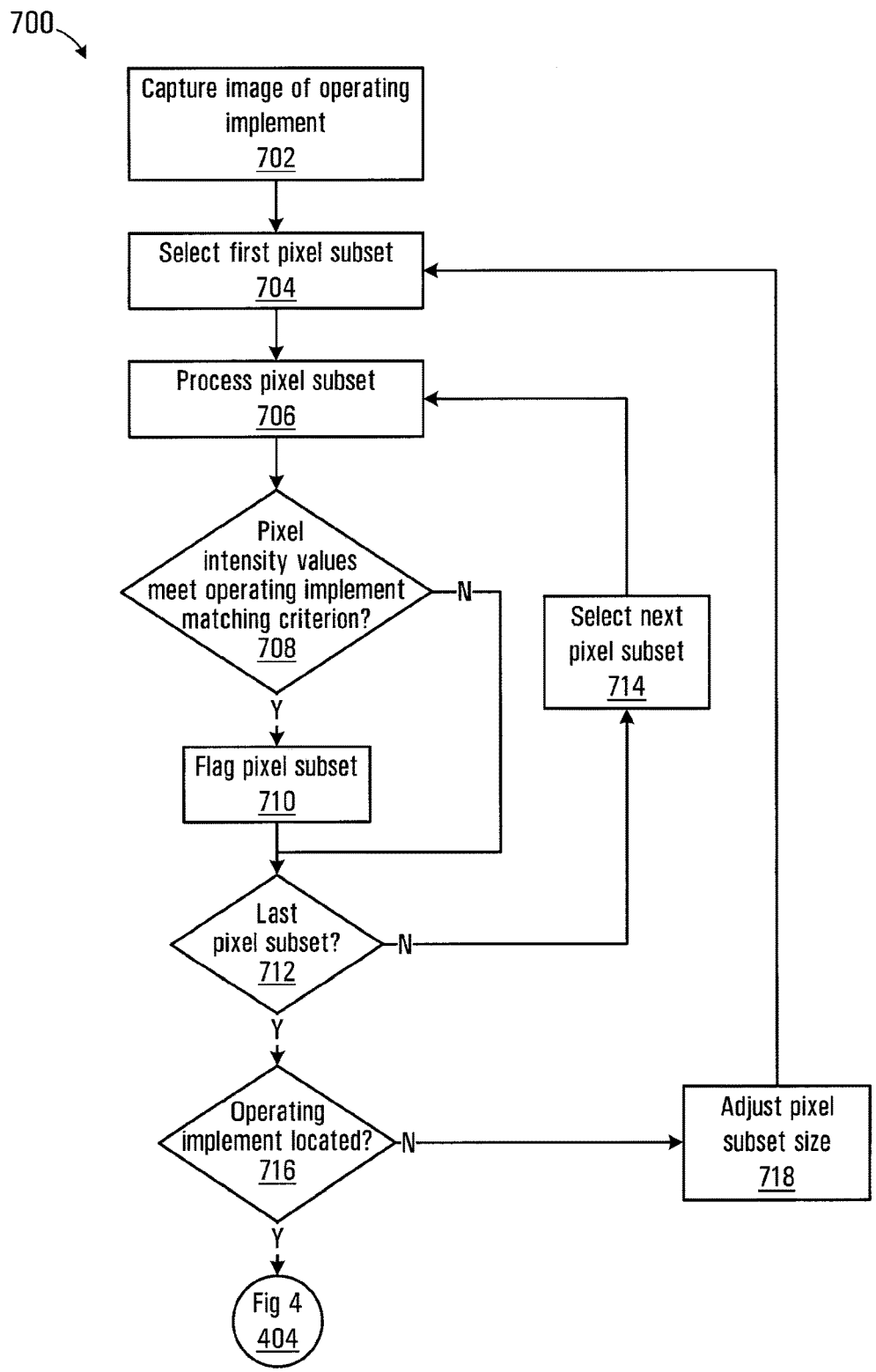
FIG. 14 is a flowchart depicting blocks of code for directing the processor circuit of FIG. 6 to locate a wear part in accordance with an alternative disclosed embodiment.
Figure 15:
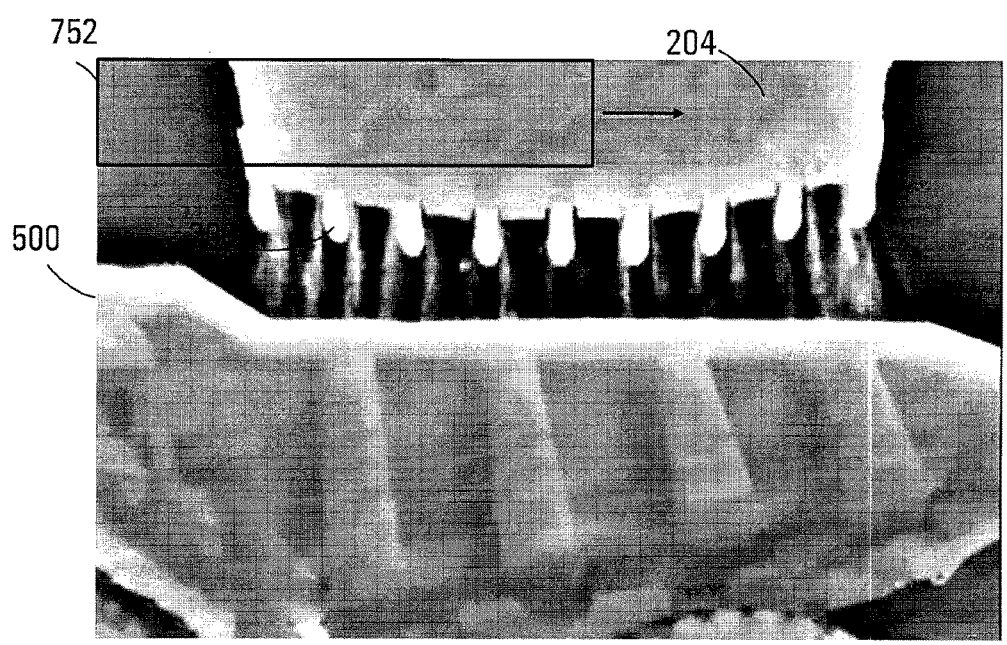
FIG. 15 is an example of a captured image of a portion of a bucket of the electric shovel shown in FIG. 2 for the process embodiment shown in FIG. 14.

Referring to FIG. 14, a flowchart depicting blocks of code for directing the processor circuit 104 to locate the a wear part in an image of an operating implement in accordance with an alternative embodiment is shown generally at 700. The process begins at block 702, which directs the microprocessor 300 to capture an image of the operating implement including a plurality of pixels. Block 704 then directs the microprocessor 300 to select a pixel subset for processing. The image 500 shown in FIG. 8 is reproduced in FIG. 15. However, referring to FIG. 15 in the embodiment shown a pixel subset 752 is selected to specifically cover a number of the teeth 256 or all of the teeth associated with the operating implement 252 rather than just a single tooth.

Block 706 then directs the microprocessor 300 to process the pixel subset, and block 708 directs the microprocessor to determine whether pixel intensity values in the pixel subset meet an operating implement matching criterion indicating a likelihood that the operating implement is within the at least one pixel subset. The determination at block 708 of whether the pixel subset 752 meets the matching criterion may be implemented generally as described above for the pixel subset 510b, except that the weights $W_{xy}$ in this embodiment are associated with the operating implement as a whole and not just the teeth 256. The operating implement matching criterion in block 708 may also be determined based on processing a labeled set of operator implement training images during a training exercise similar to that described in connection with the process 550 of FIG. 11.

If at block 708, the pixel intensity values meet the matching criterion, the process continues at block 710, which directs the microprocessor 300 to flag the pixel subset as corresponding to the operating implement. Block 710 may also direct the microprocessor 300 to save the pixel subset in the memory 300. Block 712 then directs the microprocessor 300 to determine whether the last pixel subset in the image 500 has been processed. If pixel subsets remain to be processed, block 712 directs the microprocessor 300 to block 714 and the next pixel subset is selected and the microprocessor is directed back to block 706 to process the next selected pixel subset. The pixel subset 752 is thus scanned through the image 500 as generally described above for the pixel subset 510. If at block 708, the pixel intensity values do not meet the matching criterion, the process continues at block 712.

If at block 712 no pixel subsets remain to be processed, block 712 directs the microprocessor 300 to block 716. Block 716 then directs the microprocessor 300 to determine whether the operating implement was located. If at block 710 any one of the pixel subsets had been flagged as meeting the operating implement matching criterion then the operating implement is considered to have been located and block 716 directs the microprocessor back to block 404 of the process 400 in FIG. 7. Identification of the wear part such as the teeth 256 may then proceed on the basis of the flagged pixel subset that includes the located operating implement 252. If more than one pixel subset has been flagged as meeting the matching criterion, block 716 will additionally direct the microprocessor 300 to select the pixel subset with the highest result (i.e. the highest $\Sigma R_{xy}$). If at block 716 the operating implement was not located, block 716 directs the microprocessor 300 to block 718 where the microprocessor is directed to adjust the pixel subset size. Block 718 then directs the microprocessor 300 back to block 704 and blocks 702-716 are repeated with the adjusted pixel subset. In general, captured images may have varying scale and/or aspect since the bucket 252 will move with respect to the image sensor 102 (FIG. 2) during operation providing differing perspectives for successively captured images. The size of the pixel subset 752 may this be initially set to a default value and later increased to provide a greater likelihood that the operating implement 252 is located within the image 500.

The process 700 thus facilities first identifying the bucket within the image using a matching criterion based on images of a variety of buckets, and then identifying the wear part such as the teeth once the bucket has been identified in the image.

Tracking the Wear Part

The processes described above have focused on locating a wear part within a single image. In practice, the image sensor 102 may be implemented using a video camera that produces 30 frames per second. Even in embodiments where the operating implement moves fairly rapidly, a series of image frames will be captured and at least a portion of these image frames may be processed to locate the wear part. For a fixed location of the image sensor 102 (for example on the boom 202 of the electric shovel 200), the teeth 256 will appear in many consecutive frames but will have a varying scale depending on how far away the bucket is from the image sensor 102. The teeth will also have a varying aspect due to the angle between the bucket 252 and the field of view 208 of the image sensor 102.

Figure 16:
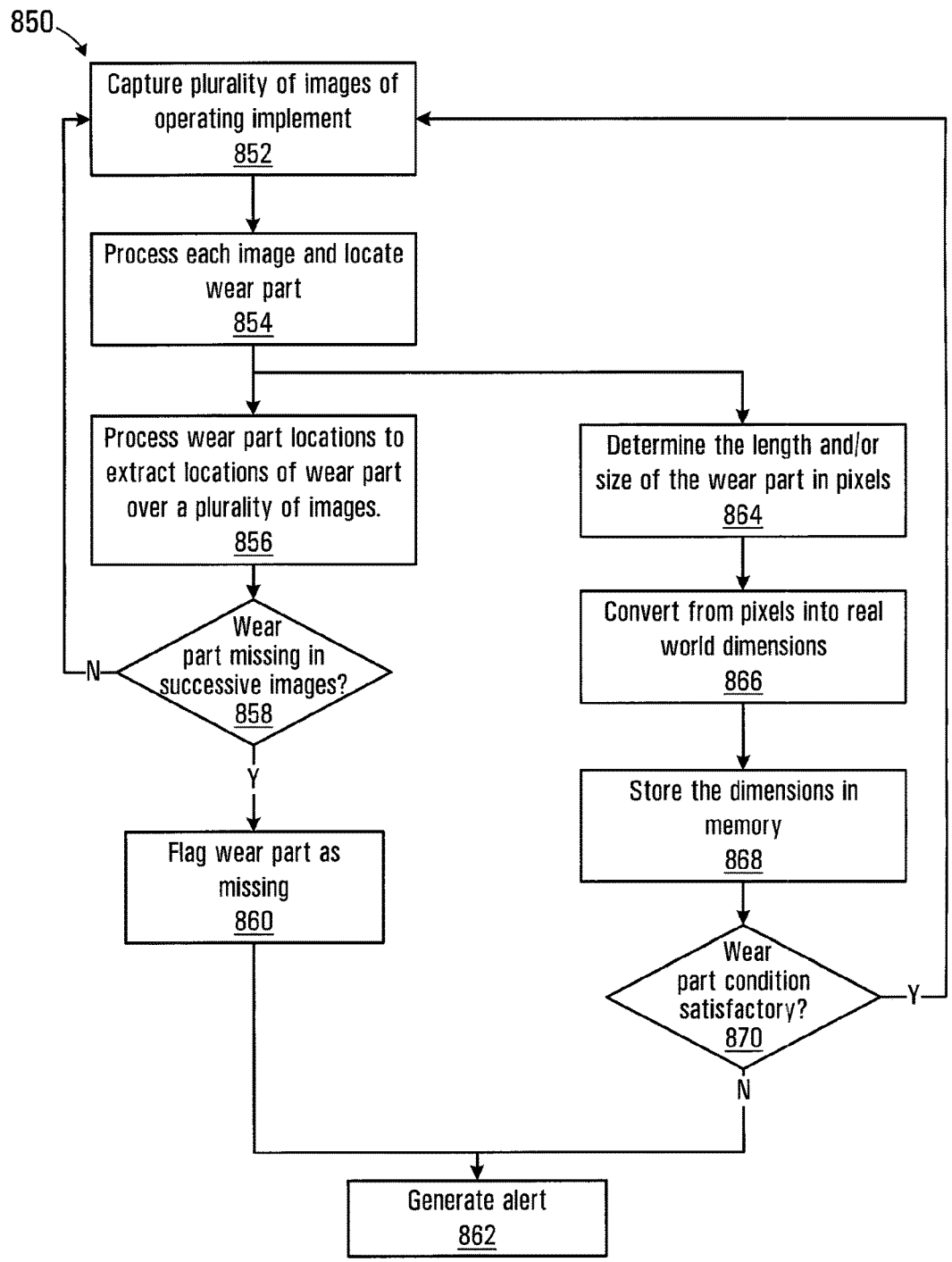
FIG. 16 is a flowchart depicting blocks of code for directing the processor circuit of FIG. 6 to locate and monitor the condition of a wear part in accordance with another disclosed embodiment.

The processing of the images to locate the teeth 256 may result in a one of the teeth not being located. While this event may be interpreted as an indication that the tooth has become detached or broken off, the event may also be a result of imperfect processing and matching at blocks 408 and 410 of FIG. 7. Referring to FIG. 16, a process embodiment in which tooth identification is based on a plurality of frames is shown generally at 850. The process begins at block 852, which directs the microprocessor 300 to capture a plurality of images of the operating implement. Conventional video cameras may produce 30 frames per second, however the processor circuit 104 may not have sufficient capacity to process frames at this rate and thus some of the frames may be discarded by the processor circuit or the capture rate of the image sensor 102 may be reduced.

Block 854 then directs the microprocessor 300 to process each image and to locate the wear part in the image 500 (or multiple wear parts in the case of the teeth plurality of teeth 256 of the bucket 252). The processing may be in accordance with the process 400 in FIG. 7 or may be a combination of process 400 and the process 700 shown in FIG. 14. The saved row can column location of each resulting pixel subsets that is flagged as including a tooth thus provides a location of the teeth within the image 500.

Figure 17:
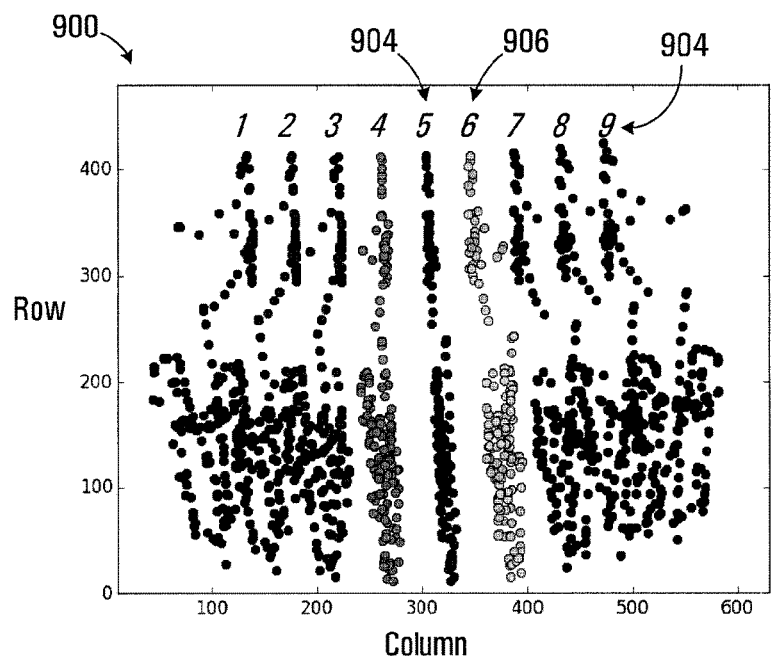
FIG. 17 is a graph showing wear part locations within a plurality of images generated in accordance with the process shown in FIG. 16.
Figure 18:
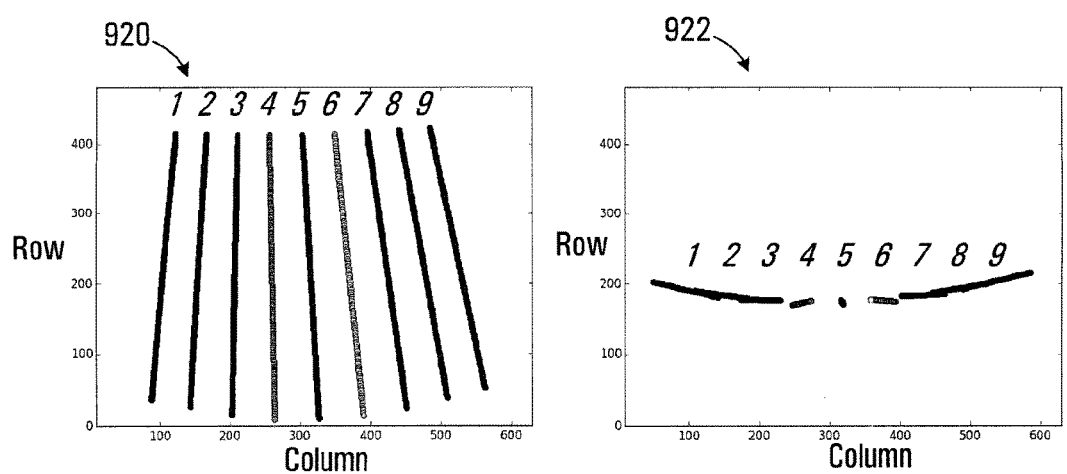
FIG. 18 is a graph showing principle components of wear part locations associated with the wear part locations shown in FIG. 17.

Block 856 then directs the microprocessor 300 to process the tooth locations to extract locations for the teeth over a plurality of images. In one embodiment, a one-dimensional (1-D) vector representing the locations of the flagged pixel subsets is generated for each of the plurality of images. The 1-D may be sized in accordance with a known number of teeth 256 for a particular bucket 252. Several of the 1-D vectors are then combined into a two dimensional (2-D) observation matrix. An example of a set of tooth locations over multiple images is depicted graphically in FIG. 17, where locations of each detected tooth are indicated by the numbers 1-9 shown at 904. The variation of tooth location can be seen as being restricted to a few different paths, for example the paths 904 and 906 of the $5^{th}$ and $6^{th}$ teeth. In one embodiment a principle component analysis is applied to extract sub-components indicating principle variations of tooth locations. Referring to FIG. 18, the highest variations in tooth location is found in two principle components shown at 920 and 922.

The process then continues at block 858 which directs the microprocessor 300 to determine whether a tooth is consistently missing in successive images or only sporadically missing in one or more images based on the principle component analysis. In one embodiment, principal components are forming a matrix of P by 2*N, where P is a number of principal components that are considered to capture 95% of variation in tooth location. N is the known number of teeth in an undamaged bucket, each having an x and y center location within the image. Assuming that M teeth have been detected within the image (M<N), a 2*M column is selected from the principal component matrix, which has a total 2*N variables. In other words, the 2*(N−M) columns from the principal component matrix are set aside and a sub-principal component is generated, which has a dimension of P by 2*M. The 1-D detected location center of teeth is then projected (which has a length of 2*M to the sub-principal component of size P by 2*M) to obtain a set of coefficients. The projection is solved by least square estimation, and an error of the estimation is computed. The process of selecting 2*M columns out of 2*N columns is then repeated and the estimation error is computed each time. The 2M columns that result in a minimum error, provides an estimate of the location of the detected teeth. Coefficients that correspond to the minimum error are multiplied by the 2*(N−M) columns which were not detected, and will identify the location of the un-detected or missing teeth.

As a result of the teeth detection and tracking in the process 850, teeth locations are estimated in successive images and the microprocessor 300 is directed to discard false positives and estimate the location(s) of possible missing teeth.

If it is determined at block 858 that a tooth is missing from successive images then the microprocessor is directed to block 860 and the tooth or other wear part is flagged as being missing. In one embodiment, a missing tooth is identified when the tooth is missing from 15 or more successive images where images are processed at a rate of about 10 images per second.

Block 862 then directs the microprocessor 300 to generate an alert for the operator, for example by displaying an alert message on the display 108, sounding a buzzer, illuminating a warning light, or a combination of alerts.

If it is determined at block 858 that there is no consistently missing tooth in successive images, the microprocessor 300 is directed back to block 852, and further images are captured and the process 850 is repeated.

In some embodiments, following block 854, the neural networks 800 or 930 may be used not only to detect the wear part, but also to measure a dimensional attribute such as the length and/or size of the wear part. This process may be generally in accordance with the process 400 in FIG. 7 or may be a combination of process 400 and the process 700 shown in FIG. 14. The process 850 may include additional blocks 864-870, which may be implemented in parallel with the blocks 856-860. Block 864 directs the microprocessor 300 to determine the dimensional attributes of the wear part in pixels. Block 866 then directs the microprocessor 300 to convert the size of wear part from pixels into real world dimensions, typically expressed in "cm" or "inches". In one embodiment a reference of known size within the image of the operating implement may be used to provide the scaling between pixels and real world dimensions. In one embodiment, a width of the operating implement or a distance between the pins of two end teeth may be used as the known references. Other parameters that have effect on the length measurement are the position of the operating implement, distance from the operating implement to the image sensor, and its orientation relative to the imaging sensor. A neural network may be trained to find the direction of the operating implement according to the coordinates of the operating implement and teeth in the image.

The process then continues at block 868, which directs the microprocessor 300 to store the dimensional attribute of the wear part in the memory 302 or mass storage unit 308 (shown in FIG. 6). Block 870 then directs the microprocessor 300 to compare the measured dimension against previously measured dimensions and to determine whether the wear part condition is satisfactory. If the condition is satisfactory block 870 directs the microprocessor 300 back to block 852 and the process is repeated. If at block 870 the wear part condition is not satisfactory, the microprocessor 300 is directed to block 862 and an alert is generated. For example, if at block 870, the length dimension of the wear part has been reduced below a replacement threshold criterion the condition may be determined not satisfactory. Alternatively or additionally, the reduction in length dimension may be tracked over time and a rate of wear used to predict failure of the part or provide information for exchanging parts.

Recurrent Neural Network Implementation

In the embodiment shown in FIG. 16, a series of image frames are captured and processed to locate the wear part. However, each successive image frame evaluated in against the same matching criterion established during the training phase. In embodiments that implement a neural network, the network may include a memory layer including nodes operable to cause results of said processing of previous images of the operating implement to configure the neural network for processing subsequent images of the operating implement. Such neural networks that exhibit temporal behavior are known as recurrent neural networks and in one embodiment may include long short-term memory units (LSTM) that is operable to modify the matching criterion based on a time series of inputs (i.e. the successive images). LSTM units are implemented to memorize some prior values for some length of time, thus altering the configuration of the neural network for processing of successive captured images. The recurrent neural network may be trained using sets of sequential labeled training images, for configuring weights of the LSTM units and other nodes of the network. The recurrent neural network may include several layers of LSTM units added to a neural network implementation.

Combinational Neural Network Implementation

Figure 19:
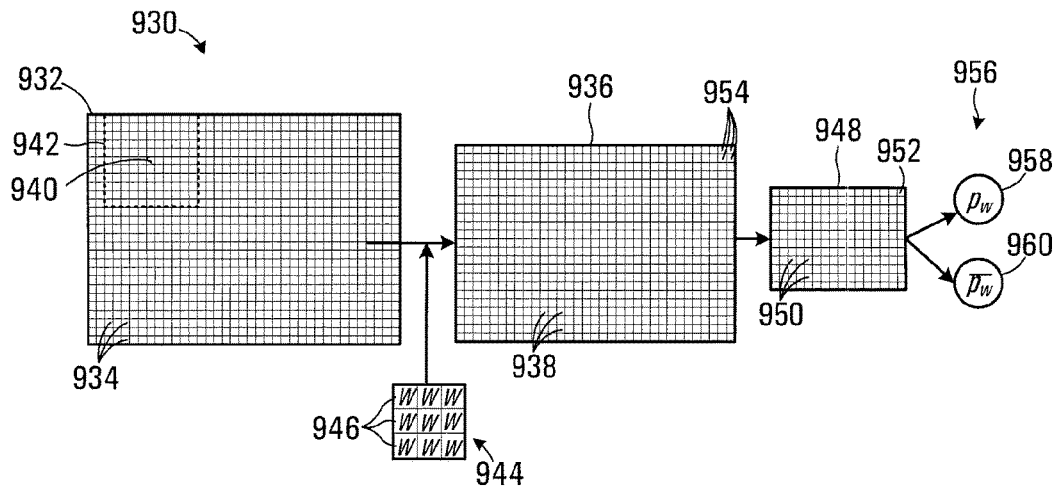
FIG. 19 is a schematic depiction of a convolutional neural network implemented on the processor circuit shown in FIG. 6.

Referring to FIG. 19, a convolutional neural network is depicted schematically at 930. The captured image is represented by the rectangle 932 and includes a plurality of pixels 934. In this embodiment the image 932 may include pixel intensity values within a wavelength range of interest, such as infrared wavelengths that convey thermal image features associated with the operating implement. In other embodiments additional pixel data sets of different wavelength ranges may be included. In neural network terms, each pixel 934 acts as an input neuron for the neural network 930.

The neural network 930 also includes a convolution layer 936 having a plurality of neurons 938. In the embodiment shown, a pixel 940 in the input image 932 is to be classified (i.e. as corresponding to a wear part or not corresponding to a wear part), and the classification is performed on the basis of a patch of pixels 942 surrounding the pixel 940. In the embodiment shown, the patch 942 is illustrated as an 11×11 pixel patch, however the patch may be sized in accordance with the sizes of features in the captured image. In some embodiments, the patch may be selected sized based on an initial size estimate for the patch 942.

In the neural network 930 each neuron 938 in the convolution layer 936 is connected to a subset of the input neurons in the image 932 by defining a convolution kernel 944. The convolution kernel 944 in this embodiment has a size of 3×3 pixels and a set of 9 weights W (946). The kernel 944 is centered over successive pixels in the patch 942 of the image 932 effectively connecting a corresponding neuron 938 in the convolution layer 936 to corresponding subsets of the pixels in the captured image 932. For the example of pixel 940, the convolution kernel 944 is passed over the patch 942 and the weights 946 are applied to the pixel intensity values to produce the output for a neuron in the convolution layer 936 that corresponds to the input pixel 940. The convolution kernel 944 similarly connects and produces outputs for other corresponding neurons 938 in the convolution layer 936. In this embodiment the convolution kernel 944 applies the same weights W to each subset of input pixels and thus will become sensitive to the same features in the input pixels when the weights are subsequently determined during a training of the neural network 930.

In one embodiment pixel-wise processing may proceed at a stride of 1 or at a stride greater than 1. In general, the stride may be selected by validating the pixel classification output and selecting a stride based on a tradeoff between processing time and the effectiveness of the location of the wear part in the image 932. An advantage of having the same weights 946 for the convolution kernel 944 is that successive patches 942 have a large overlap and convolution results may be saved and re-used for each successive patch, thus significantly reducing the number of computations required. This has the effect of significantly reducing processing time, both in training and subsequently when performing real fragmentation assessments using the trained network 930.

In other embodiments, a sparse kernel may be used to perform the convolution. A sparse kernel is constructed by inserting rows and columns of zero values in the convolution kernel 944. The sparse kernel may have a single row and column of zero values inserted between each element or multiple rows and columns of zero values inserted between elements. The sparse kernel has an advantage over processing using a stride length of greater than 1, particularly where the processing is performed by the GPU 334 (shown in FIG. 6) since operations are still performed on successive adjacent pixels in the input pixel data sets. Processing by a GPU is very effective under such conditions, while processing as a stride greater than 1 requires that processing of some input pixels is skipped, which makes much less efficient use of GPU processing capabilities.

The neural network 930 also includes a pooling layer 948, including a plurality of pooling neurons 950. The pooling layer 948 combines outputs of the convolution layer 936 to condense the information to make the neural network 930 less sensitive to input shifts and distortions. In one embodiment a max-pooling process is applied that finds a maximum output value within a group of outputs from the convolution layer 936 and sets the output of a corresponding neuron 950 in the pooling layer 948 to the maximum output value. For example, the output 952 in the pooling layer 948 may be set to the maximum output of the four output neurons 954 in the convolution layer 936. Alternatively, other pooling processes such as average pooling may be implemented where outputs in the convolution layer 936 are averaged to produce the output in the pooling layer 948. In other embodiments, stochastic pooling may be used, where a random output within a group of outputs in the convolution layer 936 is selected to produce the output in the pooling layer 948.

The neural network 930 further includes an output layer 956 that includes a neuron 958 that produces a probability $p_w$ that the image pixel 940 in the patch 942 corresponds to a wear part and a neuron 960 that produces a probability $\bar{p}_w$, that the pixel does not correspond to a wear part. In one embodiment, each of the neurons 958 and 960 may be fully connected to the neurons 938 in the pooling layer 948, which means that the neurons in the output layer 956 may each have multiple inputs that are connected to each of the neurons 938.

The embodiment of the neural network 930 shown in FIG. 19 is only one example of a network that may be configured to produce the pixel classification outputs at the output layer 956. In general the network 930 is initially configured and then trained using training images that have been examined and labeled. For example, regions of images may be labeled by an operator to indicate whether the region includes a wear part or does not include a wear part. The images are then saved along with labeling information as labeled training images. It is desirable to have a sufficient number labeled training images under different lighting and other conditions, differing scale, and differing types of operating implements and wear parts. A portion of the labeled training images may be used for training the network 930 and a further portion may be set aside for validation of the network to evaluate training effectiveness.

Figure 20:
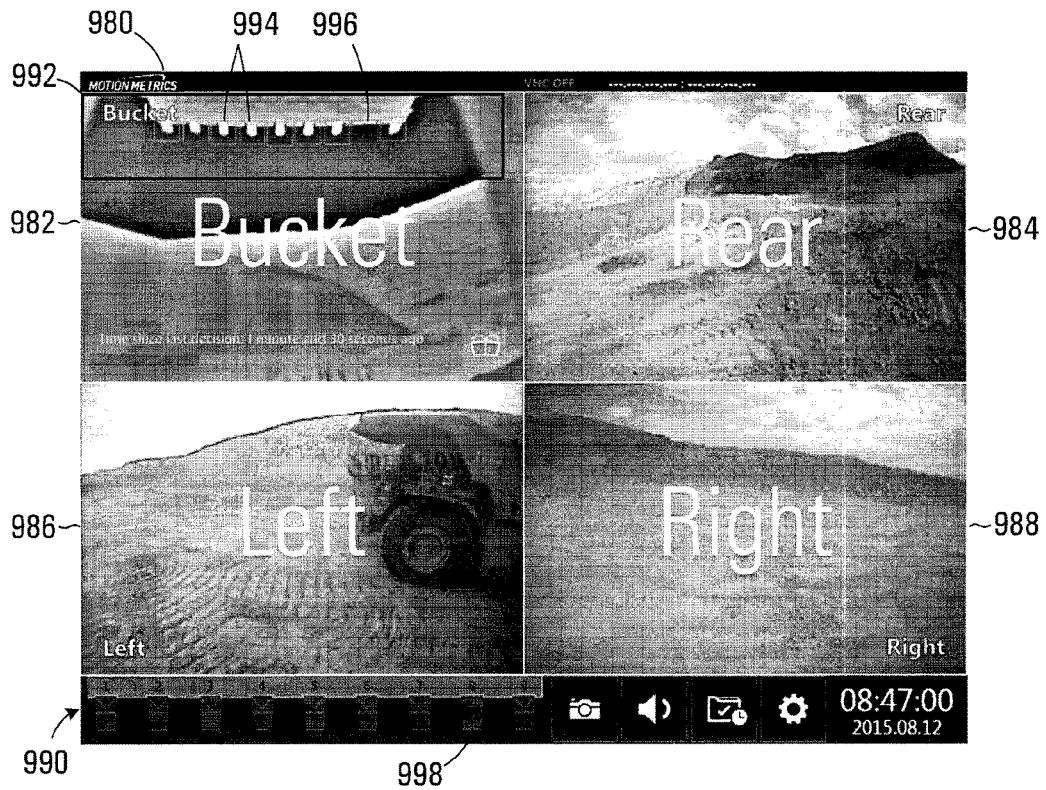
FIG. 20 is a screenshot produced on the display shown in FIG. 1.

Referring to FIG. 20, a screenshot displayed on the display 108 of the apparatus 100 of FIG. 1 is shown generally at 980. The screenshot 980 includes various views, including a view 982 of the bucket, a rear view 984 showing an area behind the heavy equipment, and left and right views 986 and 988 showing areas to the sides of the heavy equipment. The screenshot 980 also shows a schematic view 990 representing the teeth of the operating implement. In one embodiment the neural network 930 may be implemented and configured to first detect the bucket within a larger patch indicated by the rectangle 992 in FIG. 20. The neural network 930 may also be implemented and configured to detect individual teeth within the rectangle 992 that are located within patches indicated by smaller rectangles 994. In this embodiment the neural network 930 has detected that the tooth within the patch 996 is missing and has reflected this result at 998 in the schematic view 990, showing the represented tooth as being broken or missing.

Resampling Captured Image

In some embodiment, captured images may be of different scales and/or may include the operating implement and wear parts at different scales. The image 932 may be resampled to represent the wear part using smaller or larger pixels 934. As such the image 932 may be up-sampled and/or down-sampled to produce additional input pixel values for processing. The labeled training images may be similarly scaled during the training operation to different scales, for example 0.5×, 1×, and 2× thus providing additional training inputs for training the network 930. The neural network 930 may thus produce a scaled output at the output layer 956 for each scaled input pixel values and corresponding set of training images.

In the embodiments disclosed above, a tooth wear part has been used as an example for purposes of the description. However in other embodiments, other wear parts such as a replaceable lip shroud between teeth may also be identified. The above process may be combined with the process 700 for identifying the bucket and the process 400 for identifying the teeth to provide high detection reliability. In other embodiments the various disclosed processes may be varied or combined to provide a desired reliability and/or speed of detection.

The above embodiments provide a method and apparatus for reliably detecting a wear part within an image of an operating implement. Images of examples of a variety of corresponding wear parts are used to determine a matching criterion that accounts for minor variations between the wear parts and for other effects such as lighting conditions. False positive identifications may be also be avoided by including easily mistaken images of other parts of the heavy operating equipment or environment in the determination of the matching criterion.

The above embodiments have the advantage over conventional tooth detection methods and systems in that a calibration process is not mandated. In conventional tooth detection systems, a calibration process involving careful marking of each tooth location and orientation in several operating implement images (for example small, medium, and large views of the bucket within the image) and generating calibration parameters is usually required. The resulting calibration parameters teach the image processing algorithms of the conventional tooth detection system where to search for the teeth and at what orientation ranges the teeth may be encountered. While calibration may still be included in the embodiments described herein, the training exercise can effectively eliminate calibration requirements. In some embodiments, only the number of teeth may be required as a calibration parameter, and with sufficient training the determined neural network parameters will take any calibration issues into account. This may significantly reduce the installation and commissioning time, reduce system maintenance requirements, and enhance robustness of the wear part monitoring system.

While specific embodiments have been described and illustrated, such embodiments should be considered illustrative only and not as limiting the invention as construed in accordance with the accompanying claims.

What is claimed is:

1. A method for locating a wear part in an image of an operating implement associated with heavy equipment, the method comprising:
   capturing at least one image of the operating implement during operation of the heavy equipment, the image including a plurality of pixels each having an intensity value;
   selecting successive pixel subsets within the plurality of pixels;
   processing each pixel subset to determine whether pixel intensity values in the pixel subset meet a matching criterion indicating a likelihood that the pixel subset corresponds to the wear part, wherein processing each pixel subset comprises processing each pixel subset through a corresponding plurality of input nodes of a neural network, each input node having an assigned weight and being operable to produce a weighted output in response to the pixel intensity value; and
   wherein the matching criterion is based on processing a labeled set of training images during a training exercise prior to capturing the at least one image of the operating implement, the training exercise being operable to determine the assigned weights for the plurality of input nodes.

2. The method of claim 1 wherein processing each pixel subset comprises at least one of:
   directly processing the pixel intensity values;
   extracting features associated with pixels in the pixel subset; and
   generating a histogram of oriented gradients for the pixel subset.

3. The method of claim 1 further comprising receiving the weighted outputs from the input nodes at a plurality of hidden nodes of the neural network, each hidden node having an assigned weight and being operable to produce a weighted output in response to the received weighted output from the input nodes.

4. The method of claim 3 wherein the plurality of hidden nodes comprise hidden nodes in one or more layers, each successive layer of nodes operating on the outputs produced by a preceding layer.

5. The method of claim 4 wherein capturing at least one image comprises capturing a sequence of images of the operating implement during operation and wherein the one or more layers include a memory layer including nodes operable to cause results of processing of previous images of the operating implement to configure the neural network for processing subsequent images of the operating implement.

6. The method of claim 5 wherein processing the labeled set of training images during the training exercise comprises processing labeled sets of sequential training images.

7. The method of claim 3 further comprising receiving the weighted outputs from the hidden nodes at one or more output nodes, the one or more output nodes having an assigned weight and being operable to produce a weighted output in response to the weighted outputs received from the hidden nodes.

8. The method of claim 1 wherein determining whether pixel intensity values in the pixel subset meet the matching criterion comprises determining whether the weighted output exceeds a reference threshold.

9. The method of claim 1 wherein receiving the weighted outputs from the input nodes at a plurality of hidden nodes comprises:
   receiving the weighted outputs from the input nodes at a first plurality of hidden nodes in a first layer; and
   receiving weighted outputs from the first plurality of hidden nodes at a second plurality of hidden nodes in a second layer, each of the second plurality of hidden nodes having a weight and being operable to produce a weighted output in response to the received weighted output from the first plurality of hidden nodes.

10. The method of claim 1 wherein processing each pixel subset comprises:
    processing each pixel subset using a convolutional neural network having a plurality of layers including at least one convolution layer configured to produce a convolution of the pixels in each pixel subset; and
    wherein processing the labeled set of training images comprises processing training images to cause the convolutional neural network to be configured to implement the matching criterion for producing a pixel classification output indicating whether pixels in the pixel subsets correspond to the wear part.

11. The method of claim 10 wherein producing the convolution comprises producing the convolution using a sparse kernel having entries separated by rows and columns of zero values.

12. The method of claim 10 wherein producing the convolution comprises producing the convolution using a sparse kernel having entries separated by a plurality of rows and a plurality of columns of zero values.

13. The method of claim 10 wherein the convolutional neural network comprises a pooling layer configured to process the convolution to provide a plurality of pooling outputs, each pooling output being based on values associated with a plurality of pixels in the convolution.

14. The method of claim 13 wherein the pooling layer implements one of a max-pooling, an average pooling, and a stochastic pooling process.

15. The method of claim 10 further comprising resampling the image to produce a resampled plurality of pixels and wherein processing using the convolutional neural network comprises processing the resampled plurality of pixels, the convolutional neural network having been configured to implement the matching criterion using a correspondingly resampled plurality of training images.

16. The method of claim 15 wherein resampling the image comprises at least one of up-sampling the image and down-sampling the image to produce the resampled plurality of pixels.

17. The method of claim 10 wherein capturing at least one image comprises capturing a sequence of images of the operating implement during operation and wherein the convolutional neural network includes at least one memory layer operable to cause results of said processing of previous images of the operating implement to configure the convolutional neural network for processing subsequent images of the operating implement for producing a pixel classification output for the sequence of images.

18. The method of claim 17 wherein processing the labeled set of training images during the training exercise comprises processing labeled sets of sequential training images.

19. The method of claim 1 wherein the labeled training set of images comprises a set of images that have been labeled by a user.

20. The method of claim 1 wherein the labeled training set of images comprises a set of images that have been labeled by a computer implemented labeling process.

21. The method of claim 1 wherein the training images include:
  images of various examples of the wear part labeled as including the wear part; and
  other images labeled as not including the wear part.

22. The method of claim 1 wherein selecting successive pixel subsets within the plurality of pixels further comprises:
  processing the plurality of pixels to determine whether the operating implement is present in the image; and
  if the operating implement is present in the image, restricting the plurality of pixels to pixels within a region of interest that includes the operating implement prior to selecting successive pixel subsets within the plurality of pixels.

23. The method of claim 22 wherein processing the plurality of pixels to determine whether the operating implement is present in the image comprises:
  selecting at least one pixel subset within the plurality of pixels;
  processing the at least one pixel subset to determine whether pixel intensity values in the at least one pixel subset meet an operating implement matching criterion indicating a likelihood that the operating implement is within the at least one pixel subset; and
  wherein the operating implement matching criterion is based on processing a labeled set of training images during a training exercise prior to capturing the at least one image of the operating implement.

24. The method of claim 1 wherein selecting successive pixel subsets within the plurality of pixels comprises one of:
  selecting successive pixel subsets having a fixed predetermined size; and
  calculating a pixel subset size based on the captured image.

25. The method of claim 1 wherein the matching criterion includes a plurality of weights corresponding to pixels within the pixel subset and wherein processing each pixel subset comprises:
  for each pixel in the pixel subset, calculating a product of the pixel intensity and the corresponding weight to determine a weighted output for the pixel; and
  determining whether the pixel subset meets the matching criterion by determining whether a combination of the weighted outputs for the pixel subset exceed a threshold.

26. The method of claim 25 wherein determining whether the weighted outputs for the pixel subset exceed a threshold comprises:
  combining the determined weighted outputs for the pixel subset; and
  determining whether the combined weighted output exceeds a threshold.

27. The method of claim 1 wherein capturing the at least one image comprises capturing a plurality of images of the operating implement during operation of the heavy equipment and wherein the selecting and processing of pixel subsets within the plurality of pixels is performed for each image and further comprising, determining whether pixel intensity values in the pixel subsets meet a matching criterion in successive images of the plurality of images.

28. The method of claim 1 wherein capturing the at least one image comprises capturing the at least one image using an image sensor having a wavelength sensitivity in at least one of the visible spectrum and the infrared spectrum.

29. The method of claim 1 further comprising determining a dimensional attribute of the wear part.

30. The method of claim 29 further comprising determining at least one of:
  whether the condition of the wear part is satisfactory based on a pre-determined criteria; and
  a prediction of a time of failure of the wear part based on a rate of wear of the wear part over time.

31. An apparatus for locating a wear part in an image of an operating implement associated with heavy equipment, the apparatus comprising:
  an image sensor for capturing at least one image of the operating implement during operation of the heavy equipment, the image including a plurality of pixels each having an intensity value;
  a processor circuit operably configured to:
    select successive pixel subsets within the plurality of pixels;
    process each pixel subset to determine whether pixel intensity values in the pixel subset meet a matching criterion indicating a likelihood that the pixel subset corresponds to the wear part, each pixel subset being processed through a corresponding plurality of input nodes of a neural network, each input node having an assigned weight and being operable to produce a weighted output in response to the pixel intensity value; and
  wherein the matching criterion is based on processing a labeled set of training images during a training exercise prior to capturing the at least one image of the operating implement, the training exercise being operable to determine the assigned weights for the plurality of input nodes.

32. The apparatus of claim 31 wherein the image sensor comprises an image sensor having a wavelength sensitivity in at least one of the visible spectrum and the infrared spectrum.

* * * * *